(12) United States Patent
Manheim

(10) Patent No.: US 7,523,864 B2
(45) Date of Patent: Apr. 28, 2009

(54) AUTOMATIC PLACEMENT OF AN OBJECT ON A PAGE

(75) Inventor: Gene Manheim, Sunnyvale, CA (US)

(73) Assignee: Inlite Research, Inc., Sunnyvale, CA (US)

(*) Notice: Subject to any disclaimer, the term of this patent is extended or adjusted under 35 U.S.C. 154(b) by 0 days.

(21) Appl. No.: 11/637,270

(22) Filed: Dec. 11, 2006

(65) Prior Publication Data

US 2007/0199992 A1 Aug. 30, 2007

Related U.S. Application Data

(60) Provisional application No. 60/757,664, filed on Jan. 10, 2006.

(51) Int. Cl.
*G06K 7/10* (2006.01)
*G06K 5/04* (2006.01)
*G06K 9/32* (2006.01)

(52) U.S. Cl. .............. 235/462.01; 235/375; 235/462.08; 235/487

(58) Field of Classification Search ............ 235/462.07, 235/380, 375, 462.01, 462.08
See application file for complete search history.

(56) References Cited

U.S. PATENT DOCUMENTS

| | | | |
|---|---|---|---|
| 4,948,955 A | | 8/1990 | Lee et al. |
| 5,490,217 A | * | 2/1996 | Wang et al. .................. 380/51 |
| 5,506,697 A | * | 4/1996 | Li et al. ........................ 358/448 |
| 5,557,091 A | * | 9/1996 | Krummel ................ 235/462.08 |
| 6,460,766 B1 | * | 10/2002 | Olschafskie et al. ........ 235/454 |
| 6,533,175 B1 | | 3/2003 | Herzig et al. |
| 7,299,972 B2 | * | 11/2007 | Kelley et al. ................. 235/375 |
| 2002/0074408 A1 | | 6/2002 | Torchalski |
| 2004/0108381 A1 | | 6/2004 | Elliot et al. |
| 2004/0124242 A1 | * | 7/2004 | Critelli et al. .......... 235/462.08 |
| 2005/0224571 A1 | | 10/2005 | Kelley et al. |
| 2006/0022050 A1 | * | 2/2006 | Critelli et al. .......... 235/462.08 |
| 2007/0194103 A1 | | 8/2007 | Manheim |
| 2007/0246542 A1 | | 10/2007 | Manheim |

FOREIGN PATENT DOCUMENTS

WO WO 2007/081866 A2 7/2007

* cited by examiner

*Primary Examiner*—Thien M. Le
*Assistant Examiner*—Tuyen K Vo
(74) *Attorney, Agent, or Firm*—David Lewis

(57) ABSTRACT

Characteristics of a code are decided upon. For example, the geometry and how noisy the background of the barcode can be may be decided upon. A representation of the code based on the code's characteristics is automatically placed in a variety of trial locations, which are each tested to see if the current trial location is acceptable. In one embodiment, the representation of the code is slid across the document, and code may be placed in the first acceptable location found. For example, in one embodiment, if placing the code in the trial location results in obscuring foreground information, the location is determined to be unacceptable. In another embodiment, if the trial location obscures information that is critical to the purpose of the document, the location is determined to be unacceptable.

111 Claims, 15 Drawing Sheets

310

ÉTABLISSEMENTS ABCDEFG
SOCIÉTÉ ANONYME AU CAPITAL DE 300 000 F
20, RUE DU XVUTRSTBSL F 00000 NTBCLAG
Tél. : (35) 24.46.32 Adr. Tg. : NRVLJROLM
Télex : 31596 F IN : 718490070257
Transporteur (ou Transitaire)
M M. DUPONT Frères
8 quai des blcdfsh F 0000 NTBCLAG

| Mot directeur CLASSEMENT | FACTURE INVOICE | Exemplaire 15 | | |
|---|---|---|---|---|
| CODE CLIENT Z03599 | DATE 7-7-74 | NUMÉRO 06 | FEUILLET 01 | |
| Votre commande | | du 74-2-numéro 438 | | |
| Notre offre AZ/B7 | | du 74-1-numéro 12 | | |

312

LIVRAISON
5, rue XYZ
99000 VILLE

314

FACTURATION
12, rue ABCD BP 15
99000 VILLE

DOMICILIATION BANCAIRE DU VENDEUR        PAYS D'ORIGINE     PAYS DE DESTINATION

CODE BANQUE    CODE GUICHET    COMPTE CLIENT    CONDITIONS DE LIVRAISON    DATE 74-03-03

| ORIGINE | TRANSPORTS DESTINATION | MODE |
|---|---|---|
| Pays 1 | Etat 2 | Air |

LICENCE D'EXPORTATION    NATURE DU CONTRAT (monnaie)
CONDITIONS DE PAIEMENT   FAB (échéance, %...)

| MARQUES ET NUMÉROS MARKS AND NUMBERS | NOMBRE ET NATURE DES COLIS : DÉNOMINATION DE LA MARCHANDISE NUMBER AND KING OF PACKAGES: DESCRIPTION OF GOODS | NOMEN- CLATURE STATISTICAL No. | MASSE NETTE NET WEIGHT MASSE BRUTE GROSS WEIGHT | VALEUR VALUE DIMENSIONS MEASURE- MENTS |
|---|---|---|---|---|
| 74.21.456.44.2 A | 1 Composants | U 123/4 | 5 kg 8 kg | 1400 X 13x10x6 |

| QUANTITÉ COMMANDÉE ET UNITÉ QUANTITY ORDERED AND UNIT | N° ET RÉF. DE L'ARTICLE | DÉSIGNATION | QUANTITÉ LIVRÉE ET UNITÉ QUANTITY DELIVERED AND UNIT | PRIX UNITAIRE UNIT PRICE | MONTANT TOTAL TOTAL AMOUNT |
|---|---|---|---|---|---|
| 2 | AF-809 | Circuit intégré | 2 | 104,33 F | 208,66 F |
| 10 | S8-T4 | Connecteur | 10 | 83,10 F | 831,00 F |
| 25 | Z107 | Composant indéterminé | 20 | 15,00 F | 300,00 F |

| Costs | Débours | Inclus | Non inclus |
|---|---|---|---|
| Packing | Emballages | | 92,14 |
| Freight | Transport | | |
| Insurance | Assurances | | |

| | | | | | |
|---|---|---|---|---|---|
| ÉTABLISSEMENTS ABCDEFG<br>SOCIÉTÉ ANONYME AU CAPITAL DE 300 000 F<br>20, RUE DU XVUTRSTBSL F 00000 NTBCLAG<br>Tél. : (35) 24.46.32 Adr. Tg. : NRVLJROLM<br>Télex : 31596 F IN : 718490070257<br>Transporteur (ou Transitaire)<br>M. DUPONT Frères<br>quai des bicdfsh F 0000 NTBCLAG | Mot directeur<br>CLASSEMENT | | FACTURE<br>INVOICE | Exemplaire 15 | |
| | CODE CLIENT<br>2-04399 | | DATE<br>7-7-74 | NUMÉRO<br>06 | FEUILLET<br>01 |
| | Votre commande | | du 74-2-2uméro 438 | | |
| | Notre offre AZ/B7 | | du 74-1-numéro 12 | | |

312

LIVRAISON
5, rue XYZ
99000 VILLE

FACTURATION
12, rue ABCD BP 15
99000 VILLE

314

| DOMICILIATION BANCAIRE DU VENDEUR | | | PAYS D'ORIGINE | PAYS DE DESTINATION | |
|---|---|---|---|---|---|
| CODE BANQUE | CODE GUICHET | COMPTE CLIENT | CONDITIONS DE LIVRAISON | DATE 74-03-03 | |
| ORIGINE | TRANSPORTS<br>DESTINATION | MODE | LICENCE D'EXPORTATION | NATURE DU CONTRAT (monnaie)<br>FAB | |
| Pays 1 | Etat 2 | Air | CONDITIONS DE PAIEMENT (échéance, %...) | | |

| MARQUES ET NUMÉROS<br>MARKS AND NUMBERS | NOMBRE ET NATURE DES COLIS :<br>DÉNOMINATION DE LA MARCHANDISE<br>NUMBER AND KIND OF PACKAGES:<br>DESCRIPTION OF GOODS | NOMEN-<br>CLATURE<br>STATISTICAL<br>No. | MASSE NETTE<br>NET WEIGHT<br>MASSE BRUTE<br>GROSS<br>WEIGHT | VALEUR<br>VALUE<br>DIMENSIONS<br>MEASURE-<br>MENTS |
|---|---|---|---|---|
| 74.21.456.44.2 A | 1 Composants | U 123/4 | 5 kg<br>8 kg | 1400 X<br>13x10x6 |

| QUANTITÉ<br>COMMANDÉE<br>ET UNITÉ<br>QUANTITY<br>ORDERED<br>AND UNIT | N° ET REF.<br>DE L'ARTICLE | DÉSIGNATION | QUANTITÉ<br>LIVRÉE<br>ET UNITÉ<br>QUANTITY<br>DELIVERED<br>AND UNIT | PRIX<br>UNITAIRE<br>UNIT PRICE | MONTANT<br>TOTAL<br>TOTAL<br>AMOUNT |
|---|---|---|---|---|---|
| 2 | AF-809 | Circuit intégré | 2 | 104,33 F | 208,66 |
| 10 | S8-T4 | Connecteur | 10 | 83,10 F | 831,00 |
| 25 | ZI07 | Composant indéterminé | 20 | 15,00 F | 300,00 |

| | Costs | Débours | Inclus | Non Inclus |
|---|---|---|---|---|
| | Packing | Emballages | | 92,14 |
| | Freight | Transport | | |

330
Mot directeur

| ÉTABLISSEMENTS ABCDEFG<br>SOCIÉTÉ ANONYME AU CAPITAL DE 300 000 F<br>90, RUE DU XVUTRSTBSL F 00000 NTBCLAG<br>Tél. : (35) 24.46.32 Adr. Tg. : NRVLJROLM<br>Télex : 31596 F IN : 718490070257<br>Transporteur (ou Transitaire)<br>M M. DUPONT Frères<br>8 quai des bicdfah F 0000 NTBCLAG | CLASSEMENT | FACTURE INVOICE | Exemplaire 15 |
|---|---|---|---|
| | CODE CLIENT Z 04599 | DATE 7-7-74 | NUMERO 06 | FEUILLET 01 |
| | Votre commande | du 74-2-Numéro 438 |
| | Notre offre AZ/B7 | du 74-1-Numéro 12 |

| LIVRAISON | FACTURATION | |
|---|---|---|
| 5, rue XYZ | 12, rue ABCD BP 15 |  |
| 99000 VILLE | 99000 VILLE | |

332

DOMICILIATION BANCAIRE DU VENDEUR   PAYS D'ORIGINE   PAYS DE DESTINATION

CODE BANQUE   CODE GUICHET   COMPTE CLIENT   CONDITIONS DE LIVRAISON   DATE 74-03-03

| ORIGINE | TRANSPORTS DESTINATION | MODE | LICENCE D'EXPORTATION   NATURE DU CONTRAT (monnaie)<br>CONDITIONS DE PAIEMENT (échéance, %...) FAB |
|---|---|---|---|
| Pays 1 | Etat 2 | Air | |

| MARQUES ET NUMÉROS<br>MARKS AND NUMBERS | NOMBRE ET NATURE DES COLIS :<br>DÉNOMINATION DE LA MARCHANDISE<br>NUMBER AND KIND OF PACKAGES:<br>DESCRIPTION OF GOODS | NOMEN-<br>CLATURE<br>STATISTICAL<br>No. | MASSE NETTE<br>NET WEIGHT<br>MASSE BRUTE<br>GROSS WEIGHT | VALEUR<br>VALUE<br>DIMENSIONS<br>MEASURE-<br>MENTS |
|---|---|---|---|---|
| 74.21.456.44.2 A | 1 Composants | U 123/4 | 5 kg<br>8 kg | 1400 X<br>13x10x6 |

| QUANTITÉ<br>COMMANDÉE<br>ET UNITÉ<br>QUANTITY<br>ORDERED<br>AND UNIT | N° ET RÉF.<br>DE L'ARTICLE | DÉSIGNATION | QUANTITÉ<br>LIVRÉE<br>ET UNITÉ<br>QUANTITY<br>DELIVERED<br>AND UNIT | PRIX<br>UNITAIRE<br>UNIT PRICE | MONTANT<br>TOTAL<br>TOTAL<br>AMOUNT |
|---|---|---|---|---|---|
| 2 | AF-809 | Circuit intégré | 2 | 104,33 F | 208,66 F |
| 10 | S8-T4 | Connecteur | 10 | 83,10 F | 831,00 F |
| 25 | ZI07 | Composant indéterminé | 20 | 15,00 F | 300,00 F |

| | | | |
|---|---|---|---|
| Costs | Débours | Inclus | Non Inclus |
| Packing | Emballages | | 92,14 |
| Freight | Transport | | |
| Insurance | Assurances | | |

ÉTABLISSEMENTS ABCDEFG
SOCIÉTÉ ANONYME AU CAPITAL DE 300 000 F
20, RUE DU XVUTRSTBSL F 00000 NTBCLAG
Tél. : (35) 24.46.32  Adr. Tg. : NRVLJROLM
Télex : 31596 F IN : 718490070257
Transporteur (ou Transitaire)
M M. DUPONT Frères
8 quai des bicdfsh F 0000 NTBCLAG Mot directeur

| CLASSEMENT | FACTURE INVOICE | Exemplaire 15 | | |
|---|---|---|---|---|
| CODE CLIENT 04399 | DATE 7-7-74 | NUMÉRO 06 | FEUILLET 01 |
| Votre commande | | du 74-2-numéro 438 | | |
| Notre offre AZ/B7 | | du 74-1-numéro 12 | | |

LIVRAISON 5, rue XYZ

99000 VILLE

FACTURATION 12, rue ABCD BP 15

99000 VILLE

DOMICILIATION BANCAIRE DU VENDEUR

| CODE BANQUE | CODE GUICHET | COMPTE CLIENT |
|---|---|---|
| ORIGINE | TRANSPORTS DESTINATION | MODE |
| Pays 1 | Etat 2 | Air |

PAYS D'ORIGINE    PAYS DE DESTINATION

CONDITIONS DE LIVRAISON    DATE 74-03-03

LICENCE D'EXPORTATION    NATURE DU CONTRAT (monnaie)
FAB
CONDITIONS DE PAIEMENT (échéance, %...)

| MARQUES ET NUMÉROS MARKS AND NUMBERS | NOMBRE ET NATURE DES COLIS : DÉNOMINATION DE LA MARCHANDISE NUMBER AND KIND OF PACKAGES: DESCRIPTION OF GOODS | NOMEN-CLATURE STATISTICAL No. | MASSE NETTE NET WEIGHT MASSE BRUTE GROSS WEIGHT | VALEUR VALUE DIMENSIONS MEASURE-MENTS |
|---|---|---|---|---|
| 74.21.456.44.2 A | 1 Composants | U 123/4 | 5 kg 8 kg | 1400 X 13x10x6 |

| QUANTITÉ COMMANDÉE ET UNITÉ QUANTITY ORDERED AND UNIT | N° ET RÉF. DE L'ARTICLE | DÉSIGNATION | QUANTITÉ LIVRÉE ET UNITÉ QUANTITY DELIVERED AND UNIT | PRIX UNITAIRE UNIT PRICE | MONTANT TOTAL TOTAL AMOUNT |
|---|---|---|---|---|---|
| 2 | AF-809 | Circuit intégré | 2 | 104,33 F | 208,66 F |
| 10 | S8-T4 | Connecteur | 10 | 83,10 F | 831,00 F |
| 25 | ZI07 | Composant indéterminé | 20 | 15,00 F | 300,00 F |

| | Costs | Débours | Inclus | Non inclus |
|---|---|---|---|---|
| | Packing | Emballages | | 92,14 |
| | Freight | Transport | | |
| | Insurance | Assurances | | |

336    FIG. 31

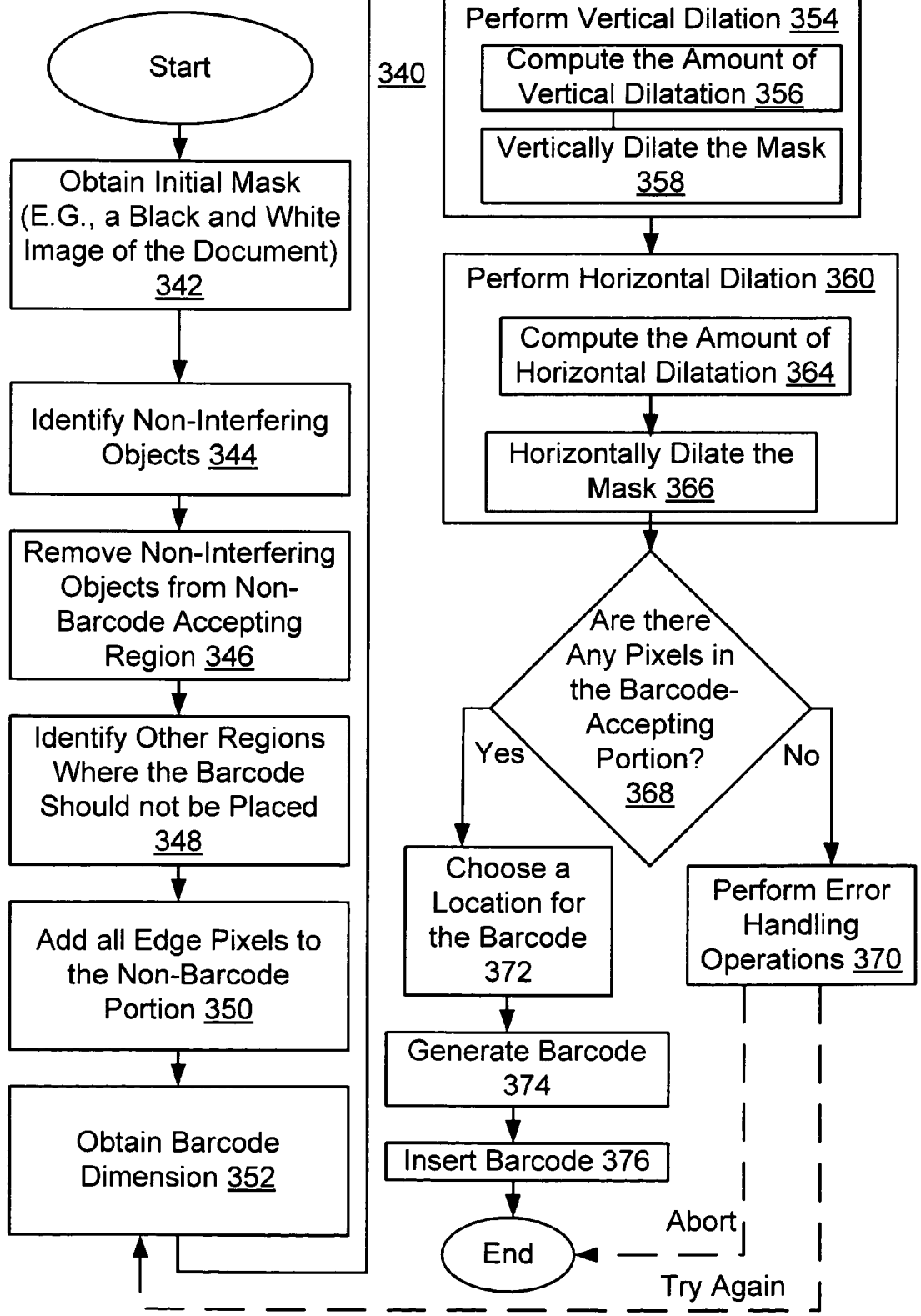

AUTOMATIC PLACEMENT OF AN OBJECT ON A PAGE

CROSS-REFERENCE TO RELATED APPLICATIONS

This application claims priority benefit of U.S. Provisional Application No. 60/757,664, entitled, "Automatic Placement of an Object on a Page," filed Jan. 10, 2006, by Gene Manheim, which is incorporated herein by reference. This application also incorporates herein by reference U.S. patent application Ser. No. 11/360,929, filed Feb. 22, 2006, entitled, "Determining Information About Documents," by Gene Manheim.

FIELD

This specification relates to the placements of an object on a page.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Barcodes may be placed on a number of different types of documents (e.g., product labels) for a variety of purposes. A location for a barcode may be determined by a human being, whom then configures a machine that prints the document with the barcode in the selected location. However, when attempting to find locations for a large number of different documents, manually deciding on the location for the barcode may be time consuming and/or tedious. Additionally, for some barcodes and/or document types, finding an acceptable location for the barcode may be tedious or time consuming and may not necessarily be reliable.

BRIEF DESCRIPTION OF THE FIGURES

In the following drawings, like reference numbers are used to refer to like elements. Although the following figures depict various examples of the invention, the invention is not limited to the examples depicted in the figures.

FIG. 3D shows an example of an initial document, which may be considered an initial mask.

FIG. 3E shows an example of a modified initial mask, which is a modified version of the initial document/mask of FIG. 3D.

FIG. 3H shows an example of a barcoded document.

FIG. 3I shows another example of a barcoded document.

FIG. 3J shows a flowchart of an embodiment of a method of creating a mask.

DETAILED DESCRIPTION

Figure 1:
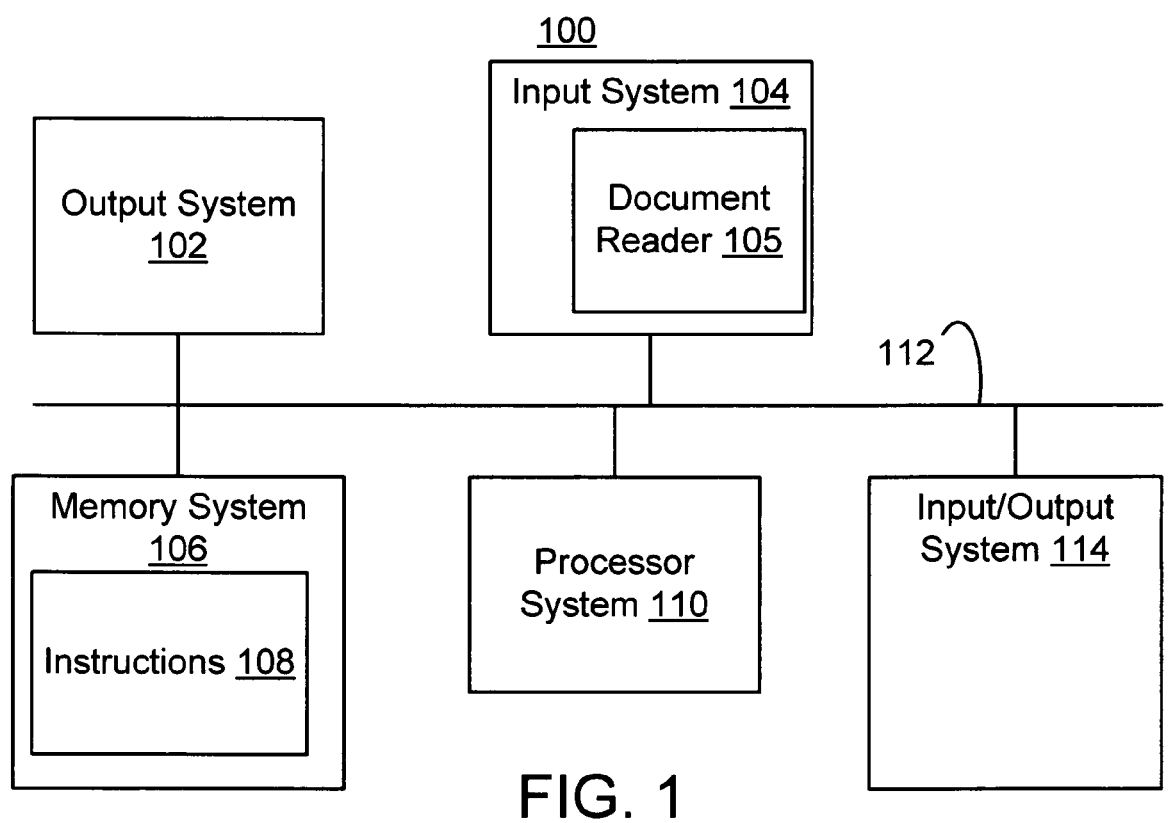
FIG. 1 shows a block diagram of a barcoding system that automatically finds a position for a barcode.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-3 and 5 is a brief description of each element, which may have no more than the name of each of the elements in the one of FIGS. 1-3 and 5 that is being discussed. After the brief description of each element, each element is further discussed in numerical order. In general, each of FIGS. 1-7 is discussed in numerical order and the elements within FIGS. 1-7 are also usually discussed in numerical order to facilitate easily locating the discussion of a particular element. Nonetheless, there is no one location where all of the information of any element of FIGS. 1-7 is necessarily located. Unique information about any particular element or any other aspect of any of FIGS. 1-7 may be found in, or implied by, any part of the specification.

In this specification, an image is a visual reproduction of an object. In this specification, the word "code" may refer to any string or pattern of characters and/or shapes that convey information other than an aesthetic appearance. In other words, a pattern that contains no other information other than its aesthetic appearance is not a code, but a pattern or string of characters that carries information (whether or not the pattern has other aesthetic features) is a code. For example, a pattern of dots, bars or characters is a code, but a picture is not a code unless other information is encoded therein in addition to the image conveyed. One example of a code is a barcode. In this specification, a barcode (which may also be referred to as a bar code) is a machine-readable representation of information in a visual format on a surface or in an image of a surface. Although this specification discusses barcodes, barcodes are discussed only as an example. Anywhere in the specification, any document element may be substituted for the barcodes to get other embodiments. Some examples of other types of objects that may be substituted for barcodes are given after the discussion of FIG. 5, but prior to the discussion of FIG. 7. In some locations the specification discusses finding a location for an additional document element instead of a barcode or for a barcode instead of an additional document element. In this specification, the term "additional document element" refers to document elements, such as a barcodes, that are added to the document, but the term additional document element may also be any other type of element that is added to the document. In this specification, the word barcode may be substituted for the term additional document and the term additional document element may be substituted for the word barcode wherever either of these the terms appear in the specification in order to obtain other embodiments.

Barcoding system 100 may include output system 102, input system 104, document reader 105, memory system 106, instructions 108, processor system 110, communications system 112, and input/output system 114. In other embodiments, barcoding system 100 may not have all of the components listed above and/or may have other components in addition to, or instead of, those listed above.

Barcoding system 100 is an example of a system that may be used for automatically locating and placing barcodes on documents. Barcoding system 100 may be an individual machine or may be a system including many different machines. For example, barcoding system 100 may be one or more computers running a barcoding program connected to a variety of peripheral devices.

Output system 102 may include any one of, some of, any combination of, or all of one or more handheld display devices, one or more printers, a speaker system, one or more interfaces to a sound system, one or more interfaces to peripheral devices and/or one or more interfaces to a computer system, intranet, and/or internet, for example. Additionally, output system 102 does not necessarily have any of the various output systems listed above, but may have another output system instead. Output system 102 may be used for outputting documents and/or document images that include an embedded barcode. A software and/or hardware module (e.g., including barcode location software) may be located inside output system 102 (for example, inside a printer and/or or printer driver—e.g., as an internal function) for placing the barcodes on documents. The barcodes may be added just before printing, via a printer. Having a barcoding module associated with the printer driver may facilitate keeping the barcoding process universal (e.g., equally available) to all applications capable of printing documents.

Input system 104 may include any one of, some of, any combination of, or all of, one or more mice, one or more track balls, one or more track pads, buttons on one or more handheld devices, one or more scanners, one or more microphones, one or more interfaces to a sound system, and/or one or more interfaces to a computer system, intranet, and/or internet (e.g., IrDA, USB), for example. Additionally, input system 104 does not necessarily have of the various input systems listed above, but may have another output system instead. Input system 104 may be used for scanning documents or receiving electronic versions of documents. Input system 104 may also be used for receiving a document or document image to which a barcode will be added. Input system 104 may include document reader 105, which may include a scanner, a digital imager, and/or a check transport. A software and/or hardware module (e.g., including barcode location software) may be located inside input system 104 (for example, inside reader 105, such as a scanner, and/or or inside a scanner driver—e.g., as an internal function) for placing the barcodes on documents. The barcode may be added immediately after acquiring the image, via scanning or receiving the image at a document reader 105 (e.g., at a scanner or other document reader). Having a barcoding module associated with the scanner driver or other document reader may facilitate keeping the barcoding process universal (e.g., equally available) to all applications capable of scanning and/or reading documents.

Memory system 106 may include, for example, any one of, some of, any combination of, or all of a long term storage system, such as a hard drive; a short term storage system, such as random access memory; a removable storage system, such as a floppy drive or a removable drive; and/or a flash memory. Memory system 106 may include one or more machine-readable media that may store a variety of different types of information. The term machine-readable medium is used to refer to any medium capable of carrying information that is readable by a machine. One example of a machine-readable medium is a computer-readable medium. The term machine-readable medium also includes mediums that carry information while the information is in transit from one location to another, such as copper wire and/or optical fiber. Memory system 106 may store one or more instructions for placing barcodes on documents and/or creating barcodes (e.g., barcode location software). Memory system 106 may include one or more instructions for carrying out any one of, any portion, of, any combination of, or all of the methods of FIGS. 3J and 4A-7.

Instructions 108 may include barcode location software, which may include one or more instructions for automatically finding a location for a barcode in a document and/or for adjusting the characteristics of the barcode to fit in a location on a document. Instructions 108 may also create barcodes and analyze the contents of a document to determine where to place the barcode and/or to determine the characteristics of the barcode. Instructions 108 may be the one or more instructions stored in memory system 106 that cause a processor to carry out the any combination of the methods of FIGS. 3J and 4A-7, which are discussed below. In this specification the terms methods and processes may be substituted for one another anywhere either appears to get new embodiments. Examples of the manner in which instructions 108 find locations for barcodes and/or adjust the characteristics of barcodes are discussed further in conjunction with FIGS. 3J and 4A-7. Different parts of instructions 108 may be stored on and/or performed by different machines of barcoding system 100.

Processor system 110 may include any one of, some of, any combination of, or all of multiple parallel processors, a single processor, a system of processors having one or more central processors and/or one or more specialized processors dedicated to specific tasks. Processor 110 may carry out instructions 108 and/or other instructions stored in memory system 106.

Communications system 112 communicatively links output system 102, input system 104, memory system 106, processor system 110, and/or input/output system 114 to each other. Communications system 112 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Figure 2:
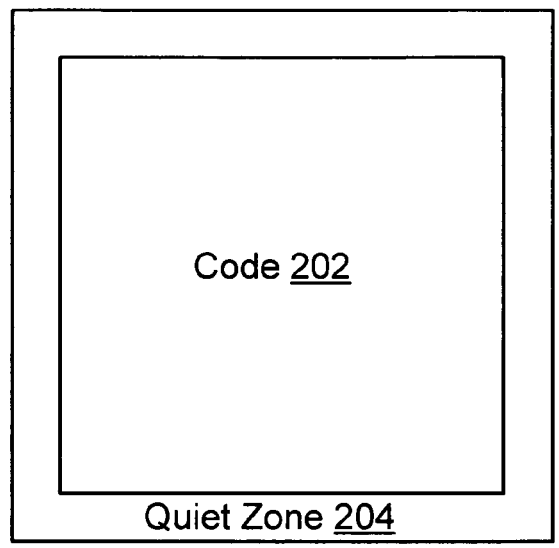
FIG. 2 shows a block diagram of an embodiment of a barcode, which may include a quiet zone.

FIG. 2 shows a block diagram of a barcode 200, which may include code 202 and quiet zone 204. In other embodiments, barcode 200 may not have all of the elements listed above and/or may have other elements in addition to, or instead of, those listed above.

Code 202 represents the actual code that makes up barcode 200. One type of barcode (that code 202 may represent) stores data in parallel lines, which may be referred to as bars, that have different widths and/or that are spaced from one another by different amounts. The information in the barcode may be stored in the distances between the beginnings of two adjacent bars and/or the distances between the ends of two adjacent bars. Alternatively, the information may be stored in the widths of bars and/or the spaces between bars. However, there are many types of barcodes that may be represented by code 202.

In one embodiment, code 202 is a two-dimensional barcode. In an embodiment, code 202 may be a matrix of code (which is a type of two-dimensional barcode) that does not consist of bars but rather a grid of square cells or cells of another geometry (e.g., another shape), such as a grid of rectangles, triangles, and/or hexagons. Each cell may contain one or more geometric shapes. Thus, depending on the embodiment, code 202 may be one or more patterns of dots, rectangles, concentric circles, and/or other geometric shapes, which may be hidden in images. In an embodiment, code 202 may be formed by taking barcodes formed by parallel bars and placing them in multiple rows, where the rows are encoded in the same manner as a single row barcode or with a different coding. A barcode formed from rows of parallel bars placed one on top of another may be referred to as a stacked barcode.

In one embodiment, code 202 may include encoding schemes that represent just numbers. In another embodiment, code 202 may represent other types of characters, such as characters from the upper case alphabet, the complete ASCII character set, and/or other symbols. Although in the above embodiments, code 202 forms a barcode, code 202 may be another type of code or object. As mentioned prior to the discussion of FIG. 1, examples of other types of elements that may be used instead of code 202 are discussed after the discussion of FIG. 5 and prior to the discussion of FIG. 7.

Quiet zone 204 may be a region of blank space or possibly low noise surrounding code 204, which may be associated with barcode 200. Quiet zone 204 may facilitate distinguishing code 202 from other document elements. In an embodiment, quiet zone 204 is one or two times the width of the narrowest element of the barcode. In this specification, the terms barcode and code include the quiet zone if a quiet zone is present. In other words, the terms barcode and code are generic to a barcode or code that has a quiet zone and to a barcode or code that does not have a quiet zone, but if a quiet zone is present the quiet zone will be considered as part of the barcode or code. The quiet zone is not necessarily white spaces, but could be color spaces or other types of low noise (or low interference) regions.

Figure 3A:
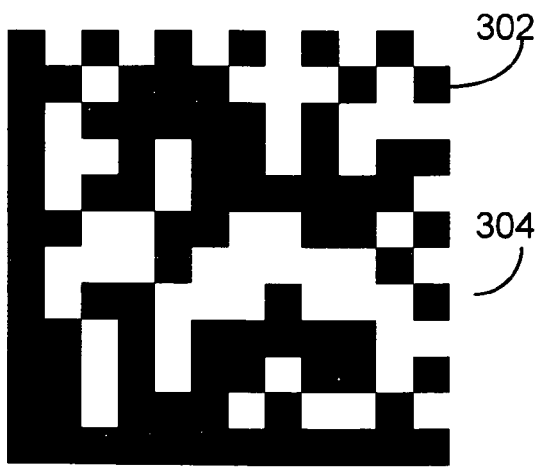
FIG. 3A shows an example of a barcode.

FIG. 3A shows an example of a barcode 300, which may include code 302 and quiet zone 304. In other embodiments, barcode 300 may not have all of the elements listed above and/or may have other elements in addition to, or instead of, those listed above. Barcode 300 is a matrix type barcode. In an embodiment, quiet zone 304 does not have any lines or markers marking its border.

Figure 3B:
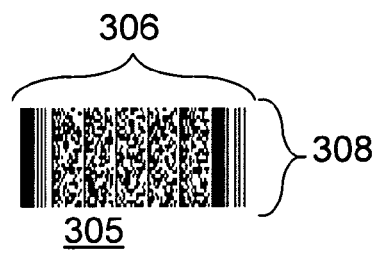
FIG. 3B shows another example of a barcode.

FIG. 3B shows another example of a barcode 305 having barcode width 306 and barcode height 308. In other embodiments, barcode 305 may not have all of the features depicted and/or may have other features in addition to, or instead of, those depicted above.

In contrast to the barcode of FIG. 3A, which is a square, barcode width 306 is different than barcode height 308. The same information may be stored in different barcodes having different geometries, having different barcode widths and heights, which may not be rectangular, and/or which may be rotated. The barcode geometry may be altered to fit a location that is available for placing a barcode.

Figure 3C:
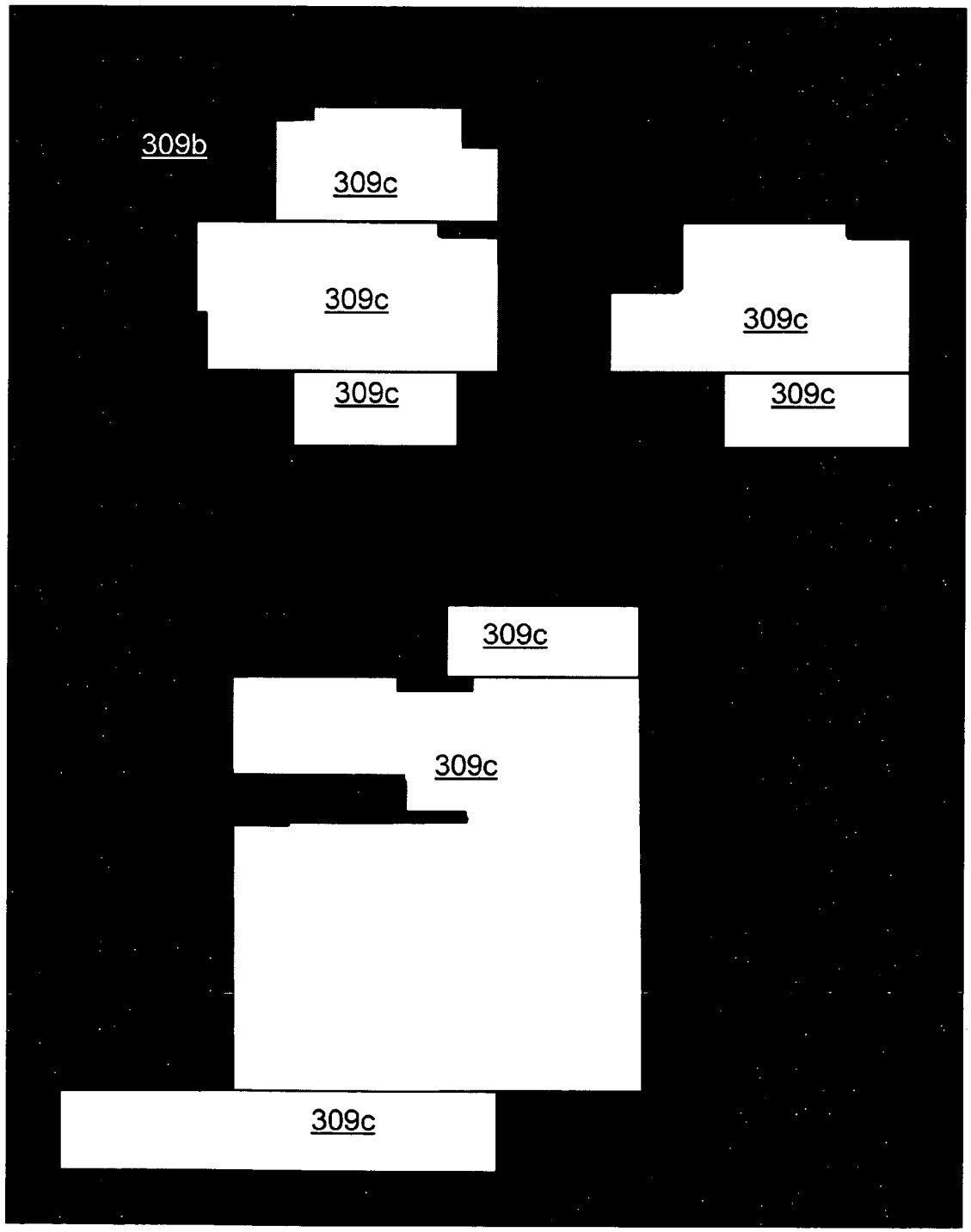
FIG. 3C shows an example of a mask having a non-barcode portion and a barcode-accepting portion.

FIG. 3C shows an example of a mask 309a having non-barcode portion 309b and barcode-accepting portion 309c. In other embodiments, mask 309a may not have all of the components listed above and/or may have other components in addition to, or instead of, those listed above.

Mask 309a will be discussed after discussing examples of what may constitute an acceptable location for a barcode (which also may constitute acceptable locations for barcodes elsewhere in the specification) and after discussing what constitutes a derivative document. In this specification, the word interference and its conjugations refer to the barcode interfering with a portion of the document for which it is desirable not to place the barcode (e.g., a forbidden portion). The portion of the document (where it may be desirable not to place the barcode) may be foreground document elements, background document elements, and/or one or more regions for which a requirement has been established that the barcode should not be placed there. Interfering may refer to any form of obscuring the barcode. For example, interference may refer to the barcode overlapping the forbidden portion or being too close to the forbidden portion.

In an embodiment in which the location of an additional document element is found, the word interference may refer to the additional document element being obscured or partially obscured by other parts of the document. Similarly, the phrase "an acceptable amount of interference" may refer to the additional document element interfering with items that do not obscure the additional document element more than is acceptable or interfering with portions of the document for which it is acceptable for the additional document element to interfere. An acceptable interference may also refer to placing the barcode (or other additional document element) in an area designated for the barcode in addition to placing the barcode in a region within the designated area where the barcode is not obscured. In some situations, such as when finding locations for additional document elements, it may be desirable to place the additional document element in a location where there is a small amount of interference, and, for example, in this location the additional document element may be partly or fully obscured. In situations in which there is some interference, the term acceptable amount of interference may refer to the interference being below a desired threshold. In yet other situations in which not only is some interference tolerable, but a certain amount of interference is desirable, the term acceptable amount of interference may refer to the interference being at or above a desired threshold. In other instances, it may be desirable to keep the additional document element in a region where the interferences is above a first threshold (or lower threshold) and below a second threshold (or higher threshold). In this case, an acceptable amount of interference refers to an amount of interferences that is between the two thresholds.

In an embodiment, an acceptable location for an additional document element is a region within which the additional document element has an acceptable amount of interference, which for example may be because the additional document element does not obscure, or does not significantly obscure, any significant document elements.

There are many ways in which a barcode (or any additional document element) may interfere with another document element. For example, a barcode may obscure a portion of a document element by overlapping a portion of a document element or, if the quiet zone is not sufficiently wide (or non-existent) a portion of the document element may be obscured by the barcode being so close to the document element that it is difficult to discern the edge of the barcode from the edge of the document element, and in this way the document element may be said to interfere with the barcode.

In another embodiment, an acceptable location for a document element may be one that does not obscure or does not significantly obscure or otherwise interfere with any document elements. In an embodiment, an acceptable location may be one that has available and sufficient space where the barcode can be placed without interfering with (e.g., in a location that does not overlap with) any document elements.

In embodiments that find a location for an additional document element, there may be some types of document elements for which it is acceptable for the additional document to interfere with, and there may be other document elements for which it is unacceptable for the additional document element to interfere with. If it is acceptable for the additional document element to interfere with some document elements, an acceptable location may be one in which the only document elements that are obscured (if any are obscured) are the document elements that can be obscured. For example, it may be unacceptable to interfere with foreground document elements and acceptable to interfere with background document elements. In this embodiment, an acceptable location may be a location that does not interfere with any foreground document elements, but may or may not interfere with a background document element.

When finding a location for an additional document element, an acceptable location for an additional document element may be one in which at least part of a document element is obscured by the additional document element, but the part of the document element that is obscured is less important, or of no greater importance, than other parts of document elements that would have been obscured had another of the locations considered been chosen. In an embodiment, an acceptable location is one in which the amount of the other document elements that the additional document element overlaps is less than or equal to other locations considered, which may minimize the amount of interference. In an embodiment, such as when this method is applied for finding locations for other document elements that are not barcodes, an acceptable location may be one in which the other document element is placed on top of text, if the text is of a different size, shade (e.g., darkness), and/or color than the barcode (so that both the additional element and the text may be read despite the overlap).

In an embodiment, when finding a location for an additional document element, a priority may be established as to which document elements are not to be interfered with by the location of the additional document element, and document elements having a lower priority are interfered with prior to document elements of a higher priority being interfered with. In this embodiment, an acceptable location may be one chosen from a set of locations tested that interferes with the smallest portions of the lowest priority document elements. The user may have the option to set the priority. There may be a default priority in which elements expected to be background and/or unimportant are given a lower priority. There may be a priority established as to where to put the additional document element in addition to, or instead of, establishing a priority of where not to place the additional document element. Similar to the priority that may be established as to where not to place the additional document element, the priority of locations as to where to place the additional document element may be established by the user and/or built into system 100. Priorities may be established as to where to place the document element in both embodiments in which at least some interference is undesirable and in embodiments in which at least some interference is desirable. Either or both of the priorities may have many levels priority or may be a trivial priority with just two levels (which may be allowed and not allowed).

A pattern recognition program may be used to distinguish different types of document elements and assign priorities to the document elements recognized. Higher priorities may be assigned according to the frequency and/or magnitude of change of pixel values, because background regions tend to have lower frequencies and lower magnitudes of change in pixel values. There may be a trade-off between the amount of interference of the document element with the additional document element and the priority of the document element that is being interfered with. Thus, in an embodiment, there may be situations in which an acceptable location has a greater amount of interference with a document element of lower priority than another location tested that has a smaller amount of interference with a document element of a higher priority.

In this specification, the terms derivative document and derived document refer to a document that was derived from the original document. The derivative document may be a computer representation of a document, such as a machine-readable copy of a document. The derivative document may result from scanning a document or initiating a printing process, for example. The derivative document may be a version of a document that contains all of the details of the original document except for possibly one or more barcodes (and/or additional document elements). The barcodes may be added to the derivative document prior to printing the document or after scanning the document, for example. A derivative document may be any representation of a document obtained by saving the document and its elements in an original medium and format or in a different medium. For example, a derivative document may refer to an intermediary form of a document that is created in an printing electronic document on paper or scanning a printed document into a computer file. The derivative document may have the same or a different format than the original document. Inserting a representation of barcodes or other additional document elements into a derivative document can be a sole purpose of the process that generates the derivative document or inserting the barcode or additional document element may be combined with other steps of the process where document is transformed from the original document to the derivative document and/or another format. For example, the process of making the derivative document can be combined with the printing of a document, acquisition of a document into a computer, sending a document to another computer. In an embodiment, a derivative representation of a barcode or other additional document element is generated in a format suitable for placement on a derivative document. The derivative representation of the barcode or other additional document element will be referred to as a derivative barcode or a derivative additional document element, respectively. The derivative barcode or other derivative additional document element may be fixed or may be determined at least in part by the geometry of the location selected for placement of the derivative barcode or other derivative additional document element. For example, if the location for the derivative barcode or derivative document element is relatively small, a geometry may be chosen that allows the derivative barcode or other derivative document element to have a larger area than other geometries considered.

Mask 309a facilitates locating a position on a document that has an acceptable amount of interference. For example, mask 309a may facilitate locating a position where the barcode will not interfere with foreground elements of the underling document. The size of the page image that makes up mask 309a is the number of pixels multiplied by the image resolution, which corresponds to the physical dimensions (the height and width) of the derived document page in centimeters or inches, for example.

The position of the barcode on the document may be represented by a particular point within the barcode. For example, the center of the barcode may be used to represent the location of the barcode. Non-barcode portion 309b is made from locations where it may be desirable not to place any part of the barcode. However, another type of mask is shown in FIG. 3G that is made from locations where it may be desirable not to place the point representing the location of the barcode (which will be discussed below). In contrast to the mask of FIG. 3G, in mask 309a no part of the barcode may be placed in any location within non-barcode portion 309b. Although all parts of barcode accepting portion 309c are illustrated as being the same shade of white and although all parts of non-barcode portion 309b are illustrated as being the same shade of black, in an embodiment, barcode accepting region 309c and/or non-barcode region 309b may include a variety of colors and/or shades, which may be used to indicate different priorities as to where an additional document element should be placed or should not be placed.

Figure 3F:
FIG. 3F shows an example of a vertically dilated mask.
Figure 3G:
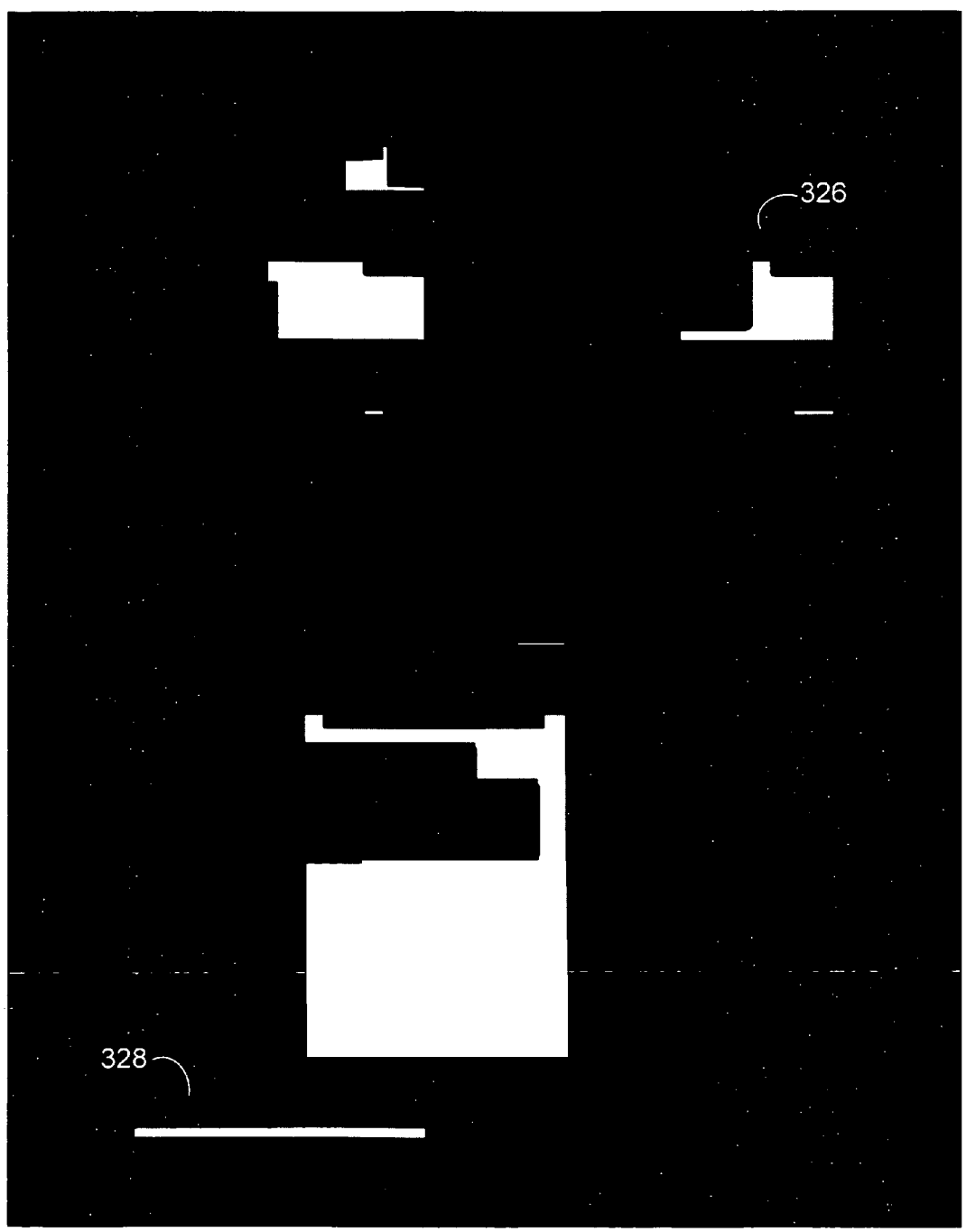
FIG. 3G shows an example of a fully dilated mask.

Prior to discussing FIG. 3D, the relationship between FIGS. 3D-3G is discussed. FIGS. 3D-3G show an example of a series of images of that may be produced in forming a mask that may be used for identifying locations where a barcode may be placed and locations where a barcode may not be placed. Each of FIGS. 3D-3F shows various intermediate stages of forming the mask of FIG. 3G. FIGS. 3H and 3I are images of documents having barcodes placed in locations identified using the mask of FIG. 3G. After discussing FIGS. 3C-3I, the method of creating the mask of FIG. 3G is discussed in conjunction with FIG. 3J. Instead of using mask 309a (FIG. 1C) to find an acceptable location for a barcode, the method associated with FIGS. 3D-3J may be used.

FIG. 3D shows an example of an initial mask 310 that may be constructed to facilitate identifying locations where the barcode may be placed. Initial mask 310 includes foreground elements 312 and background 314. In other embodiments, initial mask 310 may not have all of the components listed above and/or may have other components in addition to, or instead of, those listed above.

Initial mask 310 may be nothing more than a black and white image of the document for which it is desired to add a barcode. In this example, the initial mask is just a black and white image of the document.

Foreground elements 312 are the elements that convey the information that the document is intended to convey. Background 314 includes regions and/or elements that do not convey information that is part of the purpose of the document from which initial mask 310 was derived. Although in the example of FIG. 3D, black represents foreground elements of a document and white represents the background elements, other shadings and/or colors may be used instead. In an embodiment, foreground elements 312 are an initial non-barcode portion where barcodes should not be placed and background elements 314 are an initial barcode-accepting portion where a barcode may be placed. The entire barcode must fit within the barcode-accepting portion formed by background elements 314. Mask 309a (FIG. 3C) may be created from mask 310 by adding to the non-barcode accepting portion any spaces between foreground pixels where the barcode will not fit.

When applying the methods taught in this specification to additional document elements that are barcodes, it may be desirable to place the additional document element in areas where there is a significant amount of interference. For these applications, foreground elements 312 may be the initial additional-document-element-accepting portions and background elements 314 may be initial non-additional-document-element regions. Although in the embodiment of FIG. 3D, the additional document element would not be expected to fit within foreground elements 312, initial mask 310 may be modified in the manner further discussed in FIGS. 3E-3G and 3J or mask 309a (FIG. 1C) may be used for finding a location where additional document element has at least a certain amount of interference. Alternatively, to locate the barcode in a place where there is interference, the center of the additional document element may be placed in any part of foreground elements 312, and initial mask 310 does not need to be further modified.

FIG. 3E shows modified initial mask 316, which may include foreground elements 312, background elements 314, and forbidden zone 318. In other embodiments, modified initial mask 316 may not have all of the components listed above and/or may have other components in addition to, or instead of, those listed above.

Foreground elements 312 and background elements 314 were discussed in conjunction with FIG. 3D, above. Modified initial mask 316 differs from initial mask 310 (of FIG. 3D) in that other regions, which may be chosen by the user (for example), where it is undesirable to place the barcode, have been added to the non-barcode region.

Forbidden zone 318 is an example of a region in which the user or another entity may have specified not to place the barcode. Although in the example of FIG. 3E, forbidden zone 318 is only the border region, forbidden zone 318 may be anywhere in the document. In the example of FIG. 3E, although there was nothing located in the margin of the document, a further limitation on where the barcode could be located was that the barcode should not be placed in the margins. Consequently, the margin was added to the non-barcode portion. In other embodiments or for some applications, it may be acceptable to place the barcode in the margin (so long as the barcode is still completely on the document) in which case the margin would not be included in the non-barcode portion of the mask (e.g., the margin would remain white) at this stage. However, in an embodiment, for reasons that will be discussed in conjunction with FIG. 3F, even if the barcode may be placed in the margin, a border of one pixel wide may be placed at the edges of the document.

FIG. 3F shows vertically dilated mask 320 having vertical lines 322. In other embodiments, vertically dilated mask 320 may not have all of the components listed above and/or may have other components in addition to, or instead of, those listed above.

To create vertically dilated mask 320, a vertical line of pixels, such as vertical lines 322, that extend a fixed distance upward and downward from each pixel of the non-barcode region of mask 318 is added to the non-barcode region. If the point representing the location of the barcode is located halfway between the top edge of the barcode and the bottom edge of the barcode, then by making the length of the vertical lines (that are used to dilate mask 318) equal to half the height of the barcode, then if the point characterizing the location of the barcode is placed at the end of one of the vertical lines, the barcode will not interfere with the foreground pixel from which the vertical line was extended.

Although in the embodiment of FIG. 3F the vertical lines are extended an equal distance upward and downward from the foreground pixels, if the point characterizing the location of the barcode is chosen to be elsewhere (other than halfway between the top and bottom of the barcode), the vertical lines may be extended an amount upwards that is at least as long as the distance from the bottom edge of the barcode to the point used to characterize the location of the barcode. Similarly, the vertical lines may be extended an amount downwards that is at least as long as the distance from the top edge of the barcode to the point used to characterize the location of the barcode.

Since placing the point that represents the barcode at the edge of the document could result in part of the barcode being located off the document, the pixels at the edge of the document are also dilated. Returning to the discussion of why at least a one pixel wide border of non-barcode pixels may be added to the edge, adding the border to the edge facilitates dilating the edge, and dilating the edge facilitates ensuring that the point representing the location of the barcode is not so close to the edge that part of the barcode is located off the document. As an alternative embodiment, the edges could be dilated (that is added to the non-barcode region) as if there were a one pixel border surrounding the edge of the document without actually first adding the one pixel wide border.

FIG. 3G shows an example of a fully dilated mask 324 having locations 326 and 328. In other embodiments, fully dilated mask 324 may not have all of the components listed above and/or may have other components in addition to, or instead of, those listed above.

Locations 326 and 328 are two of the many locations in the barcode-accepting portion of fully dilated mask 324. Location 326 will be discussed further in conjunction with FIG. 3H, and location 328 will be discussed in conjunction FIG. 3I. To create fully dilated mask 324, a horizontal line of pixels extending a fixed distance to the left and to the right from each pixel of the non-barcode region of mask 322 (FIG. 3F) is added the non-barcode region. If the point chosen to represent the location of the barcode is halfway between the left edge of the barcode and the right edge of the barcode, then the length of the horizontal lines that are used to dilate mask 320 may be chosen to be equal to half the width of the barcode. In this embodiment, if the point characterizing the location of the barcode is placed at the end of one of the horizontal lines, the barcode will not interfere with that non-barcode pixel of vertically dilated mask 320 from which the horizontal line was extended.

Although in the embodiment illustrated in FIG. 3G the horizontal lines are extended an equal distance to the right and to the left from the non-barcode pixels of vertically dilated mask 320 (FIG. 3F), if the point characterizing the location of the barcode is chosen to be elsewhere (other than halfway between the left edge and right edge of the barcode), the horizontal lines may be extended an amount to the left that is at least as long as the distance from the right edge of the barcode to the point used to characterize the location of the barcode. Similarly, the horizontal lines may be extended an amount to the right that is at least as long as the distance from the left edge of the barcode to the point used to characterize the location of the barcode.

The result of creating fully dilated mask 324 is to enclose each of foreground pixels 314 (FIG. 3D) within a box at least the size of the barcode. The relative position of the foreground element within the box corresponds to the relative position of the point characterizing the location of the barcode. Specifically, the point representing the foreground element will be the same distance from the top edge of the box as the point representing the location of the barcode is from the bottom edge of the barcode, and the point representing the foreground element will the same distance from the left edge of the box as the point representing the location of the barcode is from the right edge of the barcode. Consequently, the barcode will not interfere with any of foreground elements 314 (FIG. 3D) as long as the point representing the location of the barcode is placed anywhere within the barcode-accepting portion of mask 324.

For additional document elements that are not rectangular, the additional document element may be circumscribed within a rectangle, and the method described above may be applied treating the circumscribing rectangle as if the circumscribing rectangle were the additional document element. Alternatively, the shape may be polygonal or ovular or any shape that does not have any walls that bow inwards or point inwards, and if the shape of the additional document element is not a polygonal or an ovular shape (e.g., if the additional document element has a star shape), the shape within which the foreground element is incorporated during dilation, may be a polygon or oval that circumscribes the additional document element. In an embodiment, the shape of the additional document element may be, or the shape that circumscribes the additional document element may be chosen to be symmetric about a horizontal and vertical axis going through the center of the shape. In this embodiment, during dilation, each foreground pixel is incorporated into a region of non-barcode pixels that has an ovular or polygonal shape that is the same as the additional document element or as the shape that circumscribes the additional document element, and has a size that is at least as big as the additional document element or as the shape circumscribing the additional document element. The location of the foreground pixel within the shape corresponds to the location within the additional document element of the point characterizing the location of the additional document element, such that the foreground element will be the same distance from the top edge of the shape as the point representing the location of the additional document element is from the bottom edge of the additional document element or the shape circumscribing the additional document element. Also, the point representing the foreground element will the same distance from the left edge of the shape as the point representing the location of the additional document element is from the right edge of the additional document element or the shape circumscribing the additional document element. In another embodiment, a shape that is not symmetric about the horizontal and vertical axis may be used as the circumscribing shape or the dilation may be performed for additional document elements that have shapes that are not symmetrical about the horizontal and vertical axis passing through the point representing the location of the additional document element (as long as none of the sides of the shape bow inwards or point inwards). In this embodiment, the shape used to dilate the foreground pixel is obtained by reflecting the circumscribing shape or the shape of the additional document element about a horizontal axis and about a vertical axis.

Although fully dilated mask 324 was created by first vertically dilating modified initial mask 318, and then horizontally dilating vertically-dilated-mask 320, fully dilated mask 324 could be created in another manner. For example, in an embodiment, first modified initial mask 318 is horizontally dilated, and then the resulting horizontally dilated mask may be vertically dilated. Alternatively, each foreground point could be dilated by surrounding the foreground element with a box without expressly performing a separate vertical and horizontal dilation.

Although the center point of the barcode is used as an example as the point that represents the location of the barcode, other points within the barcode may be used instead. The relationship between the mask and the underling document may be constructed based on which point within the barcode is used to characterize the location of the barcode.

The manner in which masks may be constructed is discussed in conjunction with FIGS. 3D-3G and 3J, below.

FIG. 3H shows barcoded document 330 having a barcode 332 added. In other embodiments, barcoded document 330 may not have all of the components listed above and/or may have other components in addition to, or instead of, those listed above. Barcode 332 may be the same as barcode 305. Once an acceptable location for a particular barcode is found, such as barcode 305, any document element may be placed at the location found as long as the document element has a shape and/or size that fits within a region that is the same size and shape as the barcode for which the location was found. Barcode 332 has the point representing its location placed at the barcode-accepting pixel of location 326 (FIG. 3G).

FIG. 3I shows barcoded document 334 having a barcode 336 added. In other embodiments, barcoded document 334 may not have all of the components listed above and/or may have other components in addition to, or instead of, those listed above. Barcode 336 may be the same as barcode 305. Barcode 336 has the point representing its location placed at the barcode-accepting pixel of location 328 (FIG. 3G).

FIG. 3J shows a flowchart of an embodiment of a method 340 of creating a mask, such as mask 309a or 324. In step 342, an initial mask for the document is obtained that identifies which locations are acceptable for locating a barcode. In the initial mask the non-barcode areas may correspond to foreground document elements.

Next in step 344, objects are identified that are expected to not significantly interfere with the barcode. For example, small noise objects with size of less than or equal to 3×3 pixels may be considered an acceptable amount of interference with the barcode. FIG. 3D is an example of an initial mask (which may be a black and white image of a document), which may be obtained as a result of performing step 344. The objects that are expected to not significantly interfere with the barcode may be removed from the mask by including them in the barcode accepting region (e.g., by setting the objects that are expected to not significantly interfere with the barcode to white, if white identifies non-interfering regions).

Next, in step 346, all pixels that are expected not to interfere with the barcode are added to the barcode-accepting portion (e.g., the pixels that are expected not to interfere are set to white).

Next in step 348 other regions are identified where a barcode should not be placed. Step 348 may involve identifying other limits that the barcode should not present, and determining the manner in which these limits correspond to locations on the document where the barcode should be placed or should not be placed. The locations identified may also set to black. For example, one limit may be that the barcode should not be placed within 0.5 inches of the margin. In this example, if black is used to identify the non-barcode portions, the region that is within 0.5 inches from the border may be set to black.

In optional step 350, all edge pixels are set to black. In one embodiment, a border around the edge, one pixel wide, is included in the non-barcode portion. In another embodiment, a different width is used for the border. For example, if the barcode has a quiet zone, a border the width of the quiet zone at the edges of the document may be included in the non-barcode portion of the mask (e.g., set to black). In yet another embodiment, the barcode may be placed on the edge.

In step 352, the barcode dimensions are obtained. The barcode dimensions may be used as a representation of the barcode prior to placing the barcode in a location found. For example, the height and width of the barcode are obtained (see FIGS. 2, 3A, and 3B for some examples of barcodes), which may be used as a representation of the barcode. The barcode dimensions should include the quiet zone, if a quiet zone is present. In an embodiment, the physical dimensions of the barcode may be computed by multiplying the dimension in pixels by the image resolution.

In step 354, the mask is dilated in the vertical direction. In other words, the position of the barcode may be represented by the position of a particular point on the barcode, such as the center of the barcode. The mask is expanded vertically, upwards and downwards, by an amount that will ensure that any point within the barcode-accepting portion may be chosen for the location of the barcode without the barcode interfering with a foreground document element. For example, step 354 may include steps 356 and 358.

During step 356, the dilation is computed. For example, if the point representing the location of the barcode is in the center of the barcode, the amount of dilation computed in step 356 may be equal to half the barcode height rounded up to the nearest pixel.

Next in step 358 each non-barcode point is extended upward and downward by the dilation amount computed in step 356, half the height of the barcode. The results of step 358 are shown in FIG. 3F.

Next, in step 360 the mask is dilated horizontally. Step 360 may include steps 362, 364, and 366. In step 364, the horizontal dilation is calculated, which may half the width of the barcode. The value may be rounded up to the nearest pixel. In step 366, each pixel in the non-barcode portion of the vertically dilated mask is dilated horizontally by the amount computed in the step 362. For non-rectangular additional document elements, steps 352-366 may be replaced with surrounding each foreground point with a shape that is the same as that of the barcode or circumscribing the barcode, but that has been flipped about a horizontal axis and a vertical axis whose origin is at the point representing the location of the barcode. If the shape of the barcode is symmetrical about the horizontal and vertical axis, and if the point representing the barcode is the center of the barcode, then each foreground point only needs to be surrounded by a shape that is the same size and shape as the barcode. Next in step 368, a determination is made whether there are any barcode-accepting pixels. If there are no barcode-accepting pixels, method 340 proceeds to step 370.

In step 370, an error handling routine is executed. The error handling routine may include any combination of several different error handling steps. For example, a message may be displayed indicating that no location was found. In one embodiment, method 340 is terminated. In another embodiment, a search for a position for the barcode may be conducted on another page. In another embodiment, a page may be added to the document.

In another embodiment, characteristics of the barcode may be altered. For example, the height and/or width may be adjusted. If the width and height are different, the height and width of the barcode may be switched, which may be accomplished by rotating the barcode by 90 or 270 degrees. If the shape of the barcode is adjusted, another barcode type may be chosen and/or the geometry of the shape of the barcode may be adjusted. For example, a different barcode symbology may be chosen that allows the barcode to be more compact and/or that is more amenable to a different geometry. As one example of changing the geometry, the height and width of the barcode may be adjusted. In another embodiment, the barcode may be divided into two or more smaller barcodes. If method 340 is modified for nonrectangular additional document elements, the geometry may be altered in other ways. After changing the geometry, the method returns to step 352.

In an embodiment of step 370, if an acceptable location for the barcode is not found based on one criterion of acceptability, a different criterion of acceptability is used. For example, in an embodiment in which a location for an additional document element is being sought, the initial criterion for an acceptable location may have been one in which the additional document element does not overlap any document elements. Then, if no such acceptable location was found, the criterion may be changed to one in which an acceptable location may be one that only allows part of the edges of the document elements to be overlapped by the additional document element. In another embodiment, there may be an initial threshold for the amount of overlap of document elements that is allowed or for the amount of noise that is allowed within the additional document element, and in steps 342-368 initially a location is searched for that is within the initial threshold. In this embodiment, if the initial search for the acceptable location does not find an acceptable location, steps 342-368 are repeated constructing a new mask based on the new threshold. In this embodiment, during the repetition of steps 342-368, a different threshold may be chosen that allows a greater amount of noise in the quiet zone and/or behind the additional document element or that allows a greater amount of overlap. In an embodiment, first one or more different geometries are tested (e.g., by constructing a different mask for each geometry and checking whether there are any locations left in the region of the mask that accepts the additional document element), and if no acceptable location is found for any of the geometries, then the criterion of an acceptable location is changed.

In an embodiment, barcodes may be automatically placed on a document, as defined by method 340 or other program code, and/or may be placed interactively (e.g., partially manually and partially automatically), by the user, through a user interacting with a program, via the program interface. In an embodiment, in which the barcode is placed interactively, first a mask may be constructed automatically. Then the user may be presented with a representation of the document having the barcode located in one of the barcode accepting locations of the mask. The user enters input into barcoding system 100 indicating whether the location and/or barcode type are acceptable. In an embodiment, if the user is not satisfied with the combination of barcode location and the characteristics of the barcode, the user may adjust the barcode location and/or adjust the characteristics of the barcode manually (e.g., via making entries in the program interface). In an embodiment, a user may be able to select configuration parameters for placing a preference as to where the barcode should be located if the space available in that location is adequate. In an embodiment, the user may be able to specify a certain region or group of regions within which the barcode must be located or must not be located.

Alternatively, if a location that is acceptable is not found (based on an initial criterion for an acceptable location), the location with the highest desirability is chosen. In an embodiment, if there is not enough space for a barcode, space is made. For example, if an acceptable location is not available, the barcode may be added to another document page. In an embodiment, if an acceptable location is not found, a new page may be created for the barcode, which for example could be used for barcodes that are not tightly associated with a target page (e.g., a data entry barcode). As another example, the page size may be extended or the size of the image on the page may be scaled down, and thereby reduced so that there is more room for the barcode. If the page has insufficient space in a single area to place a barcode that is large enough to contain the desired barcode data (and to meet the criterion of an acceptable location), the barcode data content can be placed in multiple smaller barcodes.

In FIG. 3J, dashed lines (instead of solid lines) indicate a flow from step 370 to step 352 and from step 370 to the termination of the method 340, because the determination of which path is to be taken depends on the embodiment of the error handling routine that is implemented as step 370. Although one of the return flow lines leads to step 352, method 340 could return to any of steps 342-368, instead, depending on which steps are to be repeated (which may depend upon the particulars of the embodiment being implemented).

In an embodiment, first steps 352-370 are implemented several times in order to test several different geometries. When a location is found that has an acceptable amount of interference, method 340 terminates. If no acceptable geometry is found, the barcode is divided into multiple smaller barcodes. If different geometries and dividing the barcode into multiple smaller barcodes does not result in finding a location for the barcode, then a position on another page is searched for. If no other pages are available or if no location exists on another page, a page is added. If a page cannot be added, then method 340 is terminated, and an indication is displayed that no location was found for the barcode.

Returning to step 368, if there is at least one barcode-accepting pixel, the method proceeds to step 372, where a position (or a list of several positions) for the barcode is identified. The position of each barcode accepting pixel may be used as the center of the barcode, for example. FIGS. 3H and 3I show two examples of locations where the barcode can be located using method 340 to construct fully dilated mask 324 of FIG. 3G, and then using method 340 the barcode is placed on the derivative document. In step 374, the barcode is generated, and in step 376 the barcode is inserted into the document. After step 376, method 340 terminates.

In an embodiment, each of the steps of method 340 is a distinct step. In another embodiment, although depicted as distinct steps in FIG. 3J, step 342-376 may not be distinct steps. In other embodiments, method 340 may not have all of the above steps and/or may have other steps in addition to or instead of those listed above. The steps of method 340 may be performed in another order. For example, step 374 may be performed at anytime during method 340. Subsets of the steps listed above as part of method 340 may be used to form their own method. Additionally, the steps of the method FIG. 3J or of any of the methods disclosed in this specification may all be performed on the same machine of barcoding system 100 or on different machines of barcoding system 100. For example, one machine of barcoding system 100 may find a location for a barcode and another machine of barcoding system 100 may place the barcode in the location found.

Figure 4A:
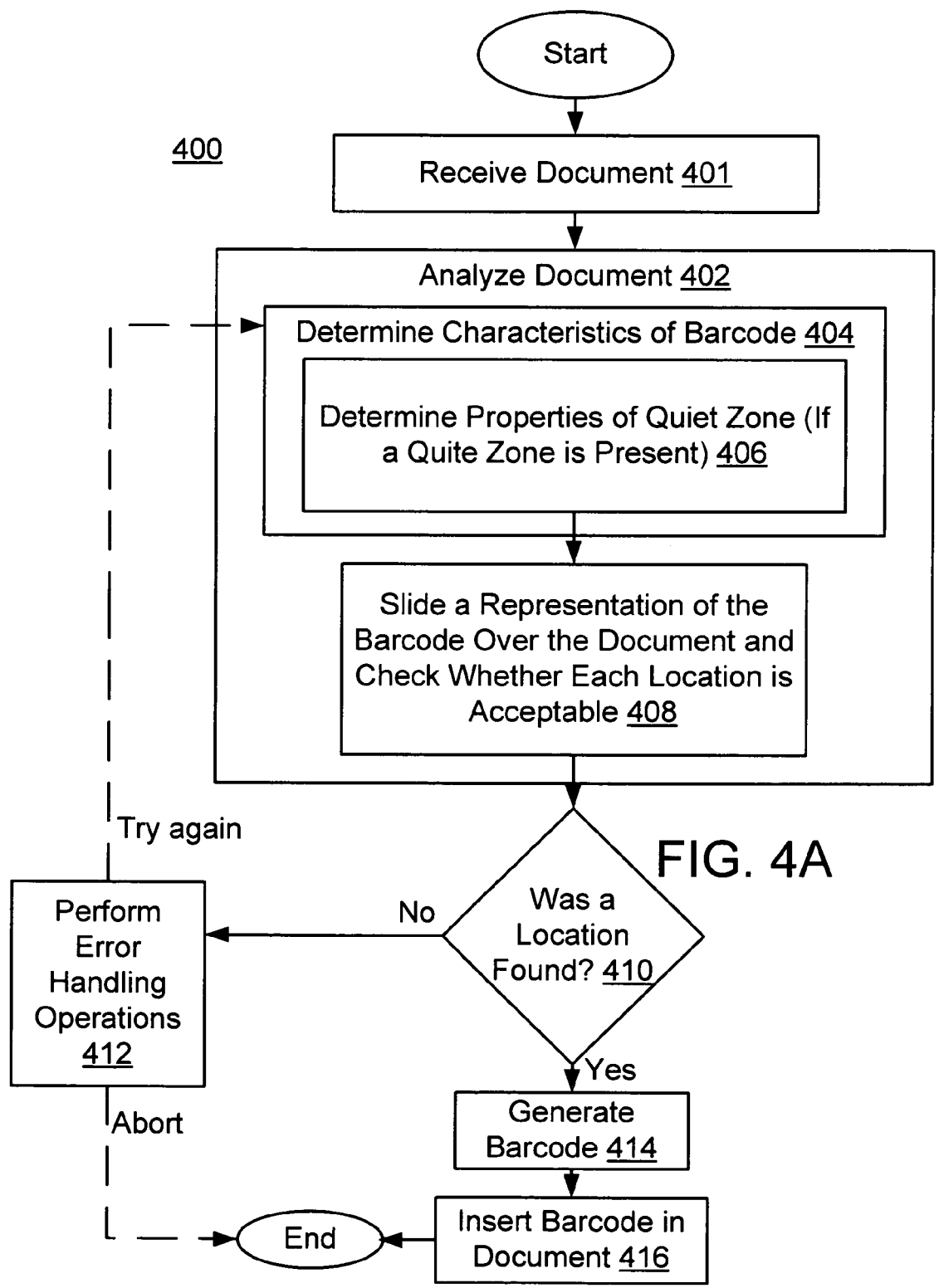
FIG. 4A shows a flowchart of an embodiment of a method that automatically finds a position for a barcode.

FIG. 4A shows a flowchart of an embodiment of a method 400 that may be included within instructions 108 of FIG. 1. During the creation of a barcode several aspects (e.g., characteristics) of the barcode may be specified (manually and/or automatically), such as the data content of the barcode, the barcode type, the geometry of the barcode, and a preferred placement of the barcode on the document page (e.g., the placement of the barcode may be automatically specified or suggested by instructions 108 (FIG. 1) and method 400). Specifying the placement of the barcode (based on the specifics of the document), using method 400, may reduce the likelihood, or completely remove the possibility, of the barcode interfering with other document elements. In other words, in method 400, instead of placing the barcode in a predefined fixed location, an acceptable location is automatically found and/or the barcode is modified to fit an acceptable location. Optionally, some of the other characteristics (such as the geometry) may be chosen or modified so that barcode better fits an acceptable location.

Regarding the steps of method 400, in step 401, the document where the barcode will be placed is received. Step 401 may include receiving an image of the document and/or scanning the document into system 100, via input system 104 and/or document reader 105. In step 402, an analysis of the document or the document image may be performed in order to identify a target location where the barcode can be placed without interfering with existing document elements. There are a number of ways of performing this analysis. For example, one possible algorithm for finding the target area may include at least the following steps.

In step 404, a size and geometry for the barcode is determined. In an embodiment, the methods used for determining and placing data in the content of the barcode, and for selecting the type and geometry selection of the barcode are not substantially different from traditional barcoding methods except that unlike traditional methods, in step 404, the type and/or geometry may be selected to based upon (e.g., to conform to) the available space. In an embodiment the barcode is rectangular in shape. In an alternative embodiment, shapes other than a rectangle may be used for the barcode and/or different portions of the barcode may be placed in different locations. During step 404, the smallest size from a set or range of possible sizes for a rectangle (or other acceptable geometric shape) containing the barcode may be determined. During step 404, if a prior analysis of the document or of a similar document was performed, the characteristics of the barcode (e.g., if the barcode is a rectangle the height width of the barcode) may be determined at least in part based on the prior analysis.

Also, optionally in step 406, a determination is made regarding how large the quiet zone needs to be and/or how much noise or information may be superimposed on the barcode and/or quiet zone without negatively affecting the readability of the barcode (as required for the document and/or the specific barcode data content, type, and geometry).

Next in step 408, the rectangle (or other geometric shape) having the geometry that was previously determined (in step 404) is slid over the document image to find one or more acceptable locations. Different criteria as to what may constitute an acceptable location for the barcode were discussed above just prior to the discussion of step 401. In an embodiment, the criterion used for what is an acceptable location for the barcode may determine the point at which step 408 ends. For example, in an embodiment in which an acceptable location is one in which the barcode does not overlap any of certain types of document elements, the rectangle (or other geometric shape) may be slid over the document until a location is found that that is large enough for the barcode to fit and that does not contain any of those types of document elements. In an alternative embodiment, instead of sliding the geometric shape over the document, a series of spots on the document are checked, and optionally some of the spots checked may partially overlap one another. There are many different ways in which step 408 may be performed. One embodiment of step 408 is discussed in FIG. 4B, below.

In an embodiment, in step 410, a determination is made as to whether a spot was found for the barcode. If an area for placing the barcode was not found, method 400 continues to step 412, which is an error handling routine. The description of step 412 is essentially the same as the description of 370 of method 340 (FIG. 3J). However, the steps that are repeated are as a result of performing step 412, which are steps of method 400 instead steps of method 340. For example, in an embodiment, the manner in which the geometry is adjusted may be based, at least in part, on information gathered during step 408. Then, after adjusting the characteristics of the barcode, the search is repeated by repeating steps 406-410 (but not necessarily step 404). In another embodiment, the search is repeated by repeating only steps 408 and 410 (but not necessarily step 406).

As another example, there may be an initial threshold for the amount of overlap of document elements that is allowed or for the amount of noise that is allowed within the barcode, and in step 406 initially a location is searched for that is within the initial threshold. In this embodiment, if the initial search for the acceptable location does not find an acceptable location, step 406 is repeated. In this embodiment, during the repetition of step 406, a different threshold may be chosen that allows a greater amount of noise in the quiet zone and/or behind the barcode or that allows a greater amount of overlap. In method 400, when different geometries are tested each geometry may be slid over the representation of the document.

In an embodiment, instead of terminating method 400 at the first location that is acceptable, a desirability of each location is computed, and the location that has the highest desirability is selected as the location for the barcode. Similar to step 370, the flow lines of step 412 leading to the next step are dashed, because which flow line is chosen depends on the embodiment. In an embodiment, step 410 may include some error handling steps. Step 410 may be the same as step 404, except this time a different geometry is chosen instead of the geometry initially chosen.

Returning to step 410, if an acceptable location for the barcode is found, method 400 continues to step 414, where the barcode image is generated. In step 416, the barcode image is inserted in the location selected.

In an embodiment, each of the steps of method 400 is a distinct step. In another embodiment, although depicted as distinct steps in FIG. 4A, step 401-416 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

Figure 4B:
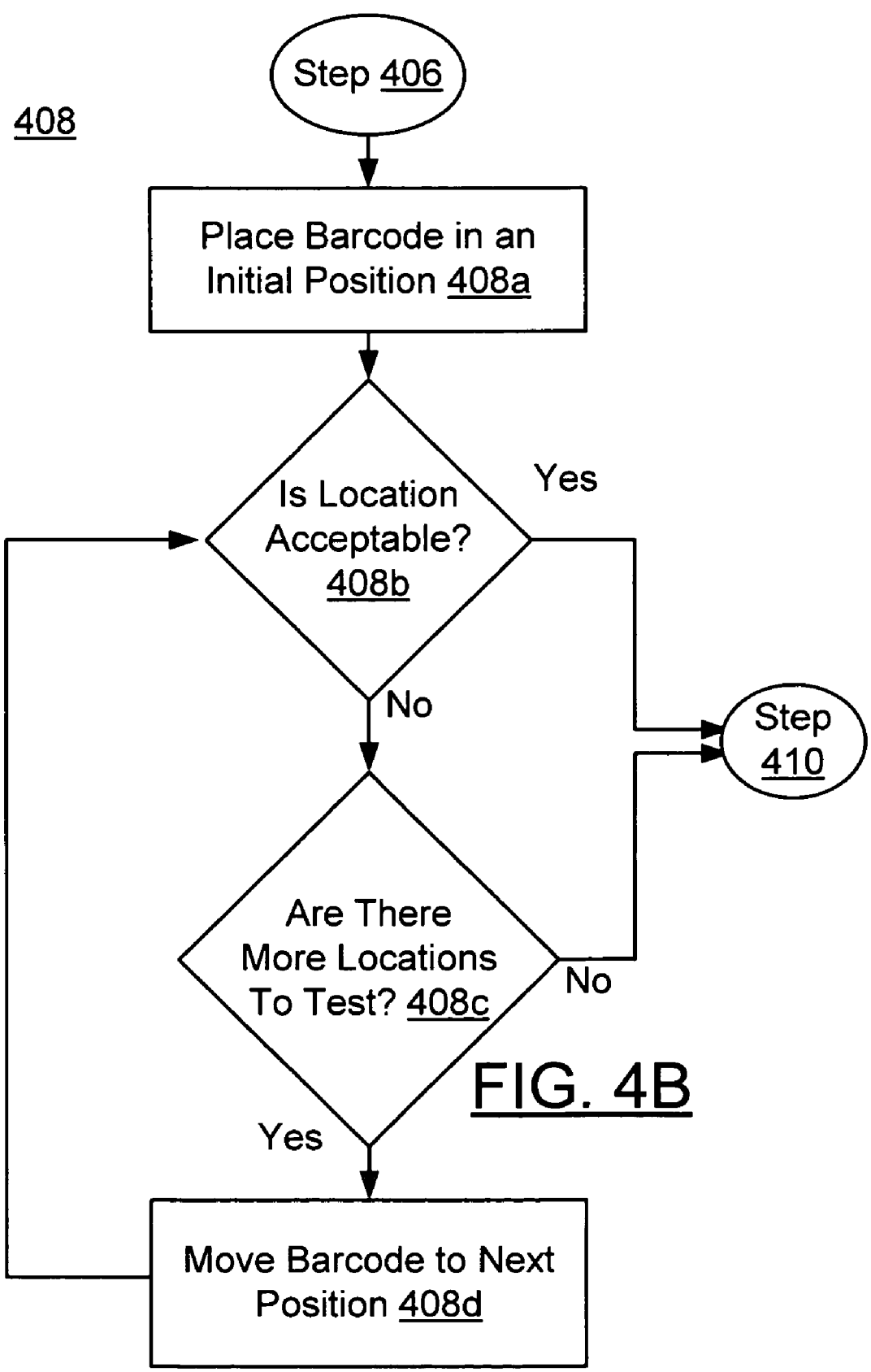
FIG. 4B shows a flowchart of an embodiment of one of the steps of the method of FIG. 4A.

FIG. 4B shows a flowchart of an embodiment for carrying out step 408 of FIG. 4A. The continuum of locations on the document may be identifiable by a continuum of horizontal and vertical coordinates (alternatively, another set of coordinates may be substituted for horizontal and vertical coordinates wherever horizontal and vertical coordinates are mentioned in the specification). The continuum of horizontal and vertical coordinates may be represented by a set of discrete values in which each discrete value of the horizontal coordinate and each discrete value of the vertical coordinate is close enough to its nearest neighbor discrete value that the barcode scanner cannot tell the difference between two locations that are that close. Alternatively, other values may be chosen for the distances between two consecutive discrete values representing horizontal or vertical coordinates, such as a percentage of the width or length of the barcode or a list of positions may be tried.

After step 406, in step 408a (which is a sub-step of step 408), a representation of the barcode is placed at an initial location on the representation of the document. For example, the initial location may be one of the corners of the document, a default location chosen by a user, or another location. Next, step 408 continues to step 408b(which is another sub-step of step 408).

In step 408b, a determination is made as to whether or not the current location is acceptable for the given barcode characteristics. If the current location is acceptable, step 408 terminates (and therefore step 408b also terminates), and method 400 continues to step 410. If the current location is not acceptable, step 408 continues to step 408c (which is another sub-step of step 408).

In step 408c, a determination is made as to whether or not all of the locations on the document have been checked for the given barcode characteristics or whether there are still locations that have not been tested. If there are no more locations to be tested, step 408 terminates (and therefore step 408c also terminates), and method 400 continues to step 410. If there are more locations to test, step 408 continues to step 408d (which is another sub-step of step 408).

In step 408d, the representation of the barcode is moved to the next location. The next location may be a location that has one horizontal or vertical component in common with the previous location and the other of the horizontal and vertical components is a value that is a nearest neighbor to the prior coordinate value (chosen from a discrete set of coordinate values). For example, each discrete horizontal and vertical coordinate value may be a distance of about 1-2.5 millimeter (e.g., 1 millimeter or 0.1 inch) to the nearest horizontal and vertical coordinate value, respectively. If the distance between adjacent discrete horizontal and between adjacent vertical coordinates is one millimeter, the barcode may be moved a distance of one micron in either the horizontal or vertical direction from the previous location. After step 408d, step 408 returns to step 408b to decide if the current location is acceptable.

For example, next a decision is made as to whether the second location is acceptable for the barcode. If it is decided that the second location is not acceptable, the third location may be tried. Each time a new location is tried steps 408b-408d are repeated. In another embodiment, another manner of choosing and testing different locations on the document may be used.

In an embodiment, each of the steps within step 408 is a distinct step. In another embodiment, although depicted as distinct steps in FIG. 4B, steps 408a-408d may not be distinct steps. In other embodiments, step 408 may not have all of the above steps and/or may have other steps in addition to, or instead of, those listed above. The steps that make up step 408 may be performed in another order. Subsets of the steps listed above as part of step 408 may be used to form their own method.

The methods of FIGS. 3J, 4A, and/or 4B may be performed by any of a number of types of machines in addition to or instead of machine 100.

Figure 5:
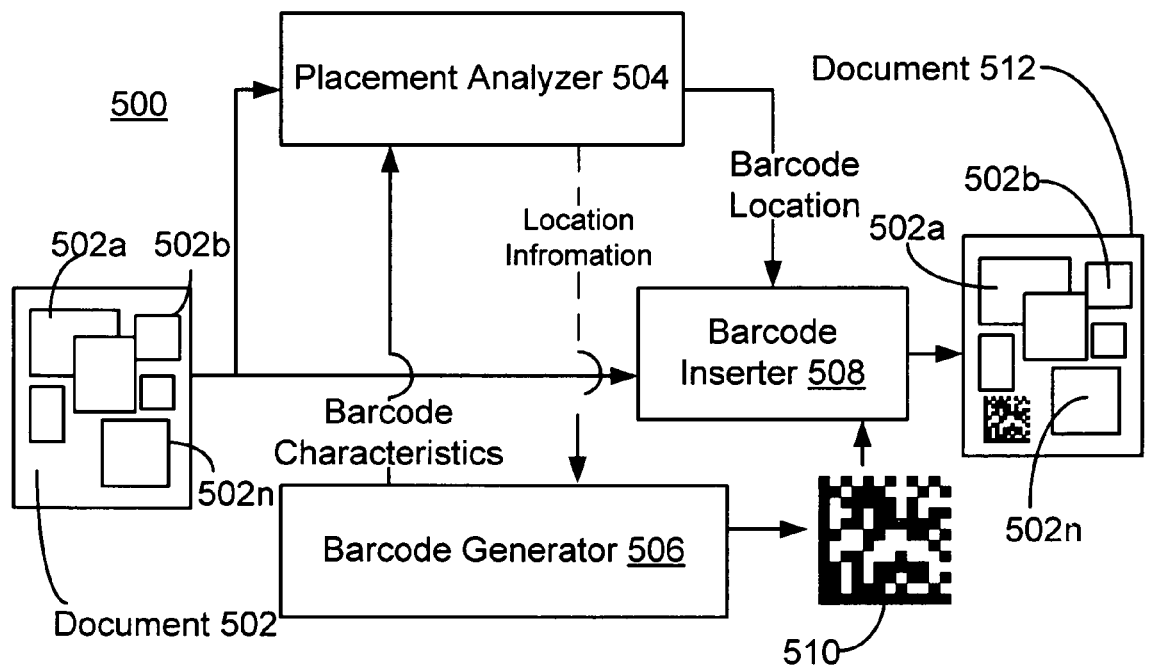
FIG. 5 shows a block diagram of an example of a process that automatically finds a position for a barcode.

FIG. 5 shows a block diagram representation of an example of a process 500 that carries out instructions 108 and/or method 400. Process 500 may include document 502 having document elements 502a-n, placement analyzer 504, barcode generator 506, barcode inserter 508, barcode 510, and document 512 (also having document elements 502a-n). In other embodiments, process 500 may not have all of the elements listed above and/or may have other elements in addition to, or instead of, those listed above. Also, in another embodiment, placement analyzer 504, barcode generator 506, and barcode inserter 508 may be hardware, software, and/or any combination of hardware and software components.

Document 502 may be any document. For example, document 502 may be a derivative document, such as an image of a document that is being created now or may be a document that was scanned in. Document elements 502a-n may be any element that may be included in a document. For example, document elements 502a-n may include text or images (e.g., pictures or codes). Document elements 502a-n may include elements that make up the foreground of document 502 and/or elements that make up the background of document 502, either of which may be text or images.

Placement analyzer 504 may receive a representation of document 502 and may receive a representation of the barcode size, geometry, and optionally quiet zone properties as input. Placement analyzer may also receive a criterion for an acceptable location for a barcode input. For example, placement analyzer may receive input that represents a threshold and/or other characterization of a maximum acceptable amount of noise that may appear in the region where the barcode is placed. Based on the input, placement analyzer 504 may analyze document 502 to determine an acceptable location for the barcode. For example, placement analyzer 504 may perform steps 342-372 of method 340 (FIG. 3J) and/or steps 402, 408, and 410 of method 400 (FIG. 4A).

Barcode generator 506 may determine the size and geometry of the barcode, and may send a representation of the geometry of the barcode to placement analyzer 504. After a location is selected for the barcode, via placement analyzer 504, barcode generator 506 may also generate the barcode. For example, barcode generator 506 may perform step 374 (FIG. 3J) or steps 404, 406, 412, and/or 414 (FIG. 4A).

Barcode inserter 508 will be discussed after discussing barcode 510. Barcode 510 is the barcode generated by barcode generator 506. For example, barcodes 200, 300 or another barcode may be used for barcode 510.

Barcode inserter 508 may receive a representation of document 502, a representation of the location determined by placement analyzer 504, and barcode 510 as input. Using this input, barcode inserter 508 may insert the barcode into document 502. Barcode inserter 508 may perform step 376 (FIG. 3J) or step 416 (FIG. 4A).

Document 512 may be the output of barcode inserter 508. Document 512 may also include document elements 502a-n (described above). Document 512 may be the same as document 502, except that barcode 510 may have been inserted into document 512 by barcode inserter 508.

After placing the barcodes in a variety of locations on different documents, a set of documents is obtained in which the location of the barcodes varies from document to document. However, when a group of documents come from different sources, it is likely that the barcodes are also in different places. There are a number of different techniques that may be used to find a barcode on a document from a group of documents having different locations for the barcode. Some examples of methods that may aid in finding a barcode on a document are (1) a machine may perform a search for the barcode, (2) the location where the barcode was placed may be stored during creation of the barcode (e.g., in a table or a record of a database), (3) the location of the barcode may be sent with the document, and/or (4) the location of the barcode may be identified manually.

In an embodiment, if the document has multiple pages, a search may be performed for a location for the barcode that is substantially the same or identical on all pages. For example, an acceptable location for the barcode may be found that has the same coordinates on all pages. For example, a location may be found that has that has the same coordinates on all pages for which a space is either empty or has a relatively smaller amount of overlap with other document elements compared to other areas considered. Similarly, a group of individual documents may be treated as a multipage document, and one location or substantially one location (e.g., having the same coordinates or substantially the same coordinates) on each of the documents may be found that meets the criterion for an acceptable location. For example, the same location (e.g., having the same coordinates) may be found on all of the documents that has less than, or the same as, the amount of overlap with document elements when compared with other locations considered. Placing the barcodes of a multipage document or of multiple documents at the same location on each page may create a more uniform appearance for the barcodes throughout the multipage document or multiple documents. Also, placing the barcodes in the same location on multiple documents may simplify finding and therefore simplify reading the barcodes.

The barcode may be added automatically, using instructions 108 (e.g., by first finding a space on the document for the barcode), to legacy documents as well as to new documents. Barcodes may be added using instructions 108 without need to modify existing document application programs. Alternatively, the application program may be modified for adding the barcodes (by for example including instructions 108 within the application program). Instructions 108 may be a standalone barcoding application or a plug-in and/or add-on module that may be attached at runtime to an underlying application program to add a barcode to a document.

Using instructions 108, the barcode may be printed on a physical copy (a hard copy) of the document in the location found. During the creation of a document (by a document application program, such as Adobe Acrobat®, Microsoft Word®, or WordPerfect®), the barcode may be added to the original document file that is produced and maintained by the document application program. As another alternative, via instructions 108, the barcode may be added to a rendered image of the document (which may be produced by a printer or scanner driver as a bitmap image file), may be added as a set of printer instructions to another set of printer instructions that are for a document, or may be added to a printed page, for example. Documents having a standardized file format structure (such as PDF or Microsoft Word®) or a control Application Interface (API, such as Office Automation) may have barcodes added to the document file. In an embodiment, the barcoded document can then be further edited by the application program even after the addition of the barcode. In an embodiment, image files (such as TIF, BMP, or JPEG, or a bitmap) may be barcoded as a part of image acquisition or image processing. Multiple instances of barcode might be created to introduce redundancy, and each instance may be placed in an acceptable location using instructions 108. The redundancy improves the reliability in case of portion of an image is damaged by handling.

As mentioned prior to the discussion of FIG. 1, although barcodes are discussed above, any element may be substituted for the barcodes. In other words, visual elements other than barcodes may also be placed in available spaces rather than in a fixed location on a document. Some examples of other visual elements whose locations are determined based on the location of available space are logos, glyphs, stamps, text, and other visual elements. Similarly, other codes may be used instead of barcodes, such as numerical codes, or another pattern that encodes information, such as a pattern of different sized black and white rectangles or dots arranged in a two-dimensional array. Additional document elements may be represented in format suitable for combining with a derivative document.

Although documents are discussed above, the above discussion applies to any type of page or file, such as a photograph (which may have been taken by a camera), video, or any other type of page, and the word "document" is to be understood to be generic to any type of page. Different specific embodiments may be obtained by substituting, text documents, pictures, videos, audio recordings or files, documents having pictures and text, or other types of pages for the word document anywhere in the specification. The word "document" may refer to an image or other computer-based document such as video or audio. The word "document" may refer to an individual file, combination of files, or portion of a document. The word "document" may refer to documents that are not computer based, such as a printed document (or to computer-based documents).

Figure 6:
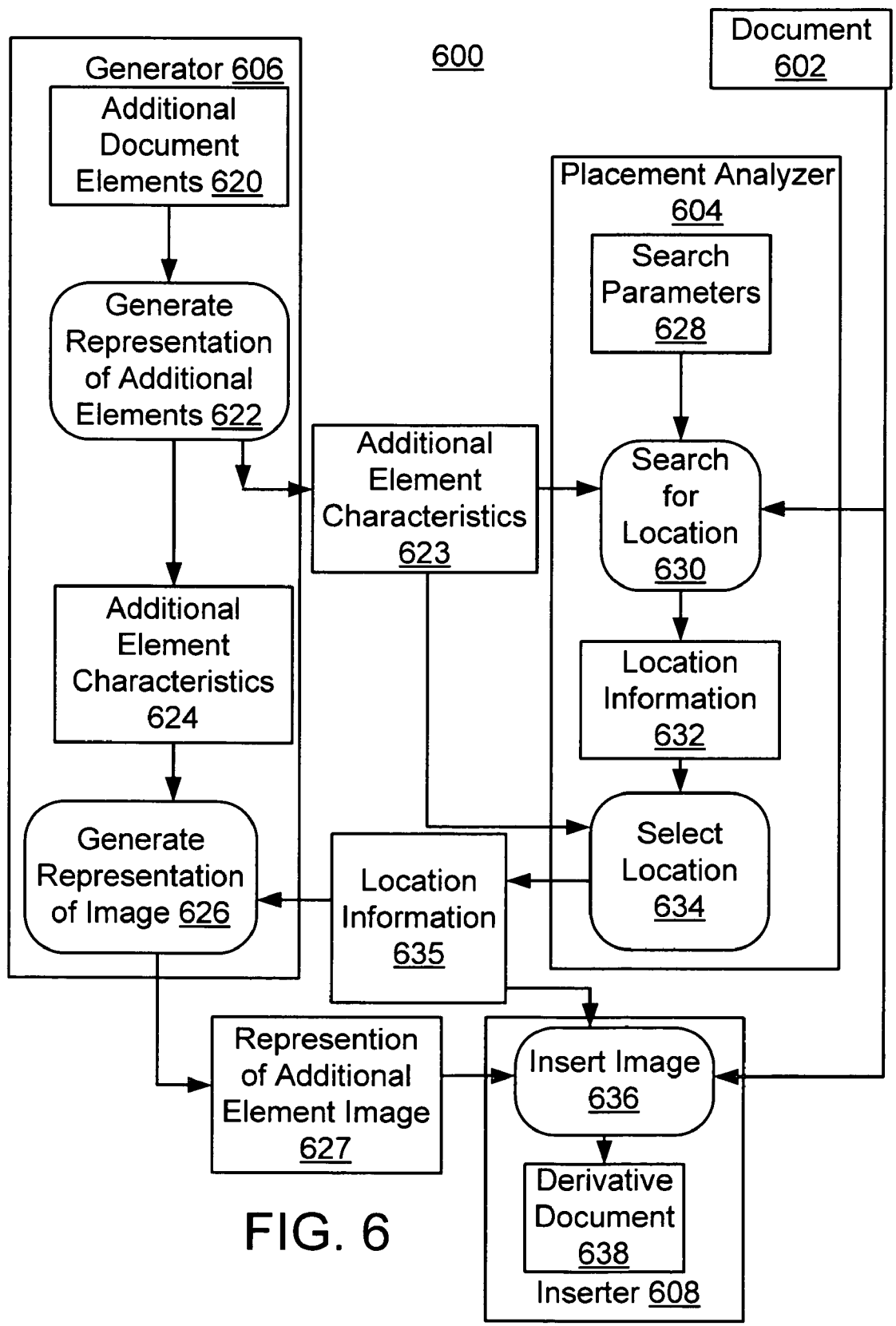
FIG. 6 shows a block diagram of an embodiment of a process for inserting an additional document element into a document.

FIG. 6 shows a block diagram of an embodiment of process 600 for inserting an additional document element into a document. Process 600 includes document 602, placement analyzer 604, generator 606, inserter 608, additional document element 620, generate representation of additional element 622, additional element characteristics 623, additional element characteristics 624, generate representation of image 626, representation-of-additional-element-image 627, search parameters 628, search for location 630, location information 632, select location 634, insert image 636, derivative document 638. In other embodiments, process 600 may not have all of the elements listed above and/or may have other elements in addition to, or instead of, those listed above. Also, in another embodiment, any of the parts of placement analyzer 604, barcode generator 606, and barcode inserter 608 may be hardware, software, and/or any combination of hardware and software components.

In FIG. 6 dashed lines are not used to show optional portions of process 600, because of the many lines that would need to be dashed. Process 600 is a more general version of process 500. Process 600 may be applied to any type of document element that one may desire to insert into a document. Some examples of additional document elements that are not barcodes are given above. Document 602, placement analyzer 604, generator 606, inserter 608, and derivative document 638 may be the same as, or similar to, document 502, placement analyzer 504, barcode generator 506, barcode inserter 508, barcode 510, and document 512, respectively. However, although the discussion of document 502, placement analyzer 504, barcode generator 506, barcode inserter 508, barcode 510, and document 512 were based primarily on barcodes, the discussion of document 602, placement analyzer 604, generator 606, inserter 608, and derivative document 638 is based primarily on other document elements. In FIG. 6, placement analyzer 604, generator 606, and inserter 608 have sharp corners, similar to placement analyzer 504, barcode generator 506, and barcode inserter 508, for consistency and to indicate that placement analyzer 604, generator 606, and inserter 608 are similar to placement analyzer 504, barcode generator 506, and barcode inserter 508, respectively. For the remaining components of FIG. 6 (which show the details of the operations of placement analyzer 604, generator 606, and inserter 608), boxes having rounded corners are used to represent functional blocks, and boxes having sharp corners are used to represent inputs and outputs to the functional blocks. Although the discussion of process 500 relate primarily to barcodes and although the discussion of process 600 relate primarily to other additional document elements any of the statements made about process 500 may be applied to process 600 and any of the statements made about process 600 may be applied to process 500. For example, although not explicitly discussed, process 500 may also have components (which have inputs and/or outputs) that are equivalent to or identical to additional element 622, additional element characteristics 623, additional element characteristics 624, generate representation of image 626, search parameters 628, search for location 630, location information 632, select location 634, insert image 636, derivative document 638.

Additional document element 620 may be any document element that one desires to add to a document. Generate representation of additional elements 622, generates one or more representations of additional document elements, which may include parameters representing characteristics of the additional document elements. For example, generate representation of additional elements 622 may receive additional document elements 602, as input and generate additional element characteristics 623 as output, which include at least enough information of the document elements for finding a location within the document for the additional document element. As a further example, additional element characteristics may include the geometry, such as the height and width of the additional document element. Additional element characteristics 623 are sent to placement analyzer 604, and may be used for finding a location for the additional document element. Generate representation of additional elements 622 may also generate representation of additional document element 624 as output, which includes enough information about the additional document element that an image of the additional document element may be generated. Additional elements characteristics 623 and additional element characteristics 624 are both based on additional document elements 620. Additional element characteristics 623 and additional element characteristics 624 may differ in that additional element characteristics 624 may be the characteristics of the additional element that are necessary and/or helpful for finding a location for the additional element, whereas additional element characteristics 624 may include enough characteristics of the additional element that an image of the additional document element may be constructed based on additional element characteristics 624.

Generate representation of image 626 receives additional element characteristics 624 as input and generates an additional element image 626 as output, which is an image of the additional document element. Optionally, generate representation of image 626 may also receive information about the geometry of possible locations as input. In this embodiment, the geometry of the image that is generated of the additional document element may vary according to the geometry of the available locations for placing the additional document element.

In other words, generate representation of image 626 may have at least two embodiments and/or basic modes of operation. In one mode of operation or in one embodiment, generate representation of image 626 generates an image of the additional document element based entirely on additional element characteristics 624, and the resulting image of the additional document element is based entirely on additional document element 620. In this embodiment or mode of operation, placement analyzer 604 finds a location for the additional document element where the additional document element fits and the additional document element is not altered, or is not necessarily altered, to fit the location.

In another mode of operation or embodiment, generate representation of image 626 generates an image of the additional document element that fits the location selected for the additional document element. In this embodiment, the geometry of the additional document element may be altered to fit the location selected, and the image generated is based both on additional element characteristics 624 and the characteristics (e.g., the geometry) of the location selected for the additional document element. In this embodiment or mode of operation, a search may be performed for an appropriate geometry for the additional document element until a geometry is found that fits the location selected. In an embodiment generate representation of image 626 may seek one or more geometries that maximize a clearance (or have at least as great of a clearance as other geometries considered) between the additional document element and the other document elements. In other embodiments and/or modes of operation, the location selected for the image of the additional document element may depend on an initial geometry or on some requirements for the geometry of the image of the additional document element. An example of a requirement for the geometry may be that the total area of the location selected may need to be more than a certain amount, the height of the area may need to be greater than a specified amount, and/or the width of the area may need to be more than a specified amount. Then, if no location that fits the initial geometry is found or once a location is found that has the selected requirement, the geometry of the additional document element is adjusted to the fit the location found.

The output of generate representation of image 626 is representation-of-additional-element-image 627, which is a representation of an image of the additional document element. For example, representation-of-additional-element-image 627 may be a series of instructions that are executable by a printer or scanner to generate an image, a series of numbers representing a bit map, or other representation of an image.

Search parameters 628 may be independent of the additional document element. Search parameters 628 may specify a specific portion of the document where the additional document element must be added and/or must not be added. Search parameters 628 may depend on the type of document, the type or additional document element, and/or the company for which the document is being generated. For example, the additional document element may be a watermark and for one company the water mark may need to be in the top half of the document, and for another company the water mark may need to be in a specified central portion of the document. In contrast, if the additional document element is a serial number, for one of the above-two companies the serial number may need to be in the top right hand corner of the page and for the other company the serial number may need to be in the bottom left hand corner of the page. As another example of search parameters 628, knowing that a certain type of additional document element is being inserted may establish certain maximum and/or minimum sizes for certain parameters. For example, in a particular industry, as a practical matter, it may be that no one uses watermarks that are larger than 2 inches high and 2 inches wide. Consequently, given the industry and/or the type of additional document element certain limits on the geometry of the additional document element may be established and included within search parameters 628.

Search for location 630 may search for one or more locations for the additional document element. Search for location 630 may receive document 602, search parameters 628, and additional element characteristics 623 as inputs, and generate location information 632 as output. Location information 632 may be in the form of a mask, a list or coordinates, or may have another format. In an embodiment, search for location 630 searches for a location where the additional document element will fit based at least in-part on additional element characteristics 623 and also based on search parameters 628. In another embodiment, search for location 630 does not receive additional element characteristics 623 or the additional document element characteristics do not completely specify the geometry or other requirements of the additional document element, and after a location is found, the geometry of the additional document element is adjusted to fit the location found.

Location information 632 may include information about where to locate the additional document element. Location information 632 may include a list of locations where the additional document element may be located. Alternatively, location information may contain only a single location, such as the first location found that meets search parameters 628 and/or that can accommodate additional element characteristics 623.

Select location 634 selects a location for the additional document element from the list of locations included in location information 632 (if more than one location is included). Select location 634 may receive additional element characteristics 623 as input in addition to receiving location information 632 as input. For example, select location 634 may choose a location that maximizes the distance between the additional document element and other document elements, based on additional element characteristics 623. Optionally, select location 634 may receive user input that is used for making a final determination of where to place the additional document element. Select location 634 may assign priorities to different acceptable locations for placing an additional document element, and may choose a final location based on the priorities. Alternatively, select location 634 may present a mask to the user showing each of the locations found and the priority assigned to that location, and then allow the user to make a final determination as to where to place the additional document element. In an embodiment search for location 630 and/or select location 634 may seek one or more locations that maximize a clearance (or have at least as great of a clearance as other locations considered) between the additional document element and the other document elements.

Location information 635 is the output of select location 634. Location information 635 is a subset of location information 632. In an embodiment, location information 635 only includes one location or one range of locations (e.g., a set of coordinates for the point representing the location of the additional document element and/or a box or other shape of a contiguous region within which the additional document element should be placed).

In one embodiment, location information 635 is sent to generate representation of image 626, and using image generator 626 a geometry is selected or a search is conducted for a geometry for the additional document element that fits the location specified by location information 635, as was discussed in conjunction with image generator 626. In an embodiment, if search for location 630 was not able to find a suitable location (or if search for location 630 was skipped or conducted without benefit of additional element characteristics 623) location information 635 may contain a location that although not suitable, it better than or at least as suitable as other locations considered, and image generator searches for geometry for the additional document element that fits in the location specified by location information 635.

In another embodiment, location information is sent to insert image 636, and the image of the additional document element is inserted at the location represented by location information 635. Insert image 636 receives document 602, additional element image 636, and location information 635 as input and produces derivative document 638 as output. Derivative document 638 is document 602, except that additional element image 636 has been added to document 602 at the location represented by location information 635.

In the above description of process 600, searching for a location for the image of the additional document element and searching for a geometry for the additional document element are depicted as two distinct processes in which either one or the other is performed or in which first one is performed and then the other is performed. However, in an embodiment, the location for the image of the additional document element and the geometry for the additional document element may be searched for at the same time, iteratively. For example, first a set of locations that meet certain initial set of criteria are found, then a set of geometries are found that fit within all of or some of the locations found. Next, the criteria for the locations is made more stringent, such as by tailoring the criteria for the locations to the set of geometries found in the prior step, and then a search is done for the locations that meet the more stringent set of criteria. For example, the first set of criteria may have allowed a certain amount of interference, and the second set of criteria may allow a smaller amount of interference. Then a new set of geometries are found that fit into most or all of the smaller set of locations found. This process could be continued until a single geometry and location or a set of geometries and locations are found that have no interference between the image of the additional document element and the foreground elements of the document.

Process 600 or any of the other processes and methods described above, can be applied in a manner in which a single additional document element is inserted into a document each time the process 600 or any of the other processes are implemented. Alternatively, multiple additional document elements may be inserted after each search of a document based on just one search for locations, one application of process 600 or any of the above processes. The multiple additional elements may be independent of one another, substantially similar to one another, or may be duplicates the same additional document element, for example. Alternatively, additional element might be represented by several portions, each being placed individually.

When there are multiple additional document elements, a search for all of, or several of, the multiple additional document elements can be performed in one step based on characteristics derived from the representation of each additional document element. Alternatively, a search for the locations where the additional document elements can be placed may be implemented as a separate search, location selection, representation generation, and placement for each additional document element, group of additional document elements or sub-group of additional document elements. A search for locations (e.g., via method 340, method 400, method 408, process 500, and/or process 600) may be performed on a document or on a portion of a document, for example a page or portion of a page. A search may be performed (e.g., via method 340, method 400, method 408, process 500, and/or process 600) on a representation of a document suitable for search. For an image of a document the representation may be the image. In an embodiment, only a portion of the document is converted into a searchable representation and then that portion is searched.

The parameters of a search may include information about areas where a search should not be performed, preferred areas where a search should be performed, the order in which areas should be searched or a preference for where an additional document element should be located. Another way in which a search may be characterized may be by specifying the level of interference between additional document elements and other elements of the document. If the additional document element is a barcode the amount of interference should be limited to assure the readability of the barcode. In other situations, such as a if the additional document element is a watermark, the level of interference should be high to ensure that the watermark is covered by another document element, or to prevent the separation of the additional document element from the other document elements.

In an embodiment, a search produces information identifying locations where additional elements can be placed on the derivative document. This information can be in the form of discrete zones, and the information may include each zone's position and size information. Alternatively it can be in the form of a mask, where the zone forms a continuous area, and each part of the area may be capable of accepting an additional document element.

Based on characteristics of the representations of the additional document elements and on the acceptable locations for placing the additional document element, a selection may be made for the position of the additional document element. If the additional document element has multiple representations, a representation suitable for the selected location may be chosen or identified. The selection of one of the locations found during the search may be performed automatically by an algorithm or interactively receiving input from a user through a user interface that either selects a suitable representation (e.g., a particular geometry) or is used as a basis for the algorithm making a final selection.

Prior to the selection, a priority can be established for preferential treatment of one location over another. For example locations in the lower right corner of the page might have preference over locations in the upper right corner. Similarly, in some situations is which additional document elements are being added to multiple pages (either to multiple pages of the same document or to multiple documents) it may be preferable to place the additional document element in the same location on each page. In this case, similarly positioned location on each page may be preferred and may therefore be assigned a higher priority than positions that are far apart or that are not the same or that are not essentially the same location.

In an embodiment, the search parameters do not include characteristics of the additional document element, and the location information may be obtained once. The location information may be used multiple times for placing several different additional document elements on the same page or document. If the search parameters include limiting characteristics based on multiple representations of the additional document elements, then the location information can be used for the placement of any additional document elements that match those limiting characteristics. Once a location for an additional document element on derivative document is found, the same location can be used repeatedly to place substantially similar additional document elements on the same derivative document in place of the original additional document element or on other derivative documents having the same layout or fitting the same template. For example, barcodes having the same geometry (but that have different encoded values) can be placed at the same location on different documents having the same format. Once a location for an additional document element on a derivative document is found it can be used repeatedly to place additional elements on substantially similar documents. Examples of such documents are forms that have the same format or template and are filled in with different user data. If the user data areas do not overlap with the location for additional elements, any variation in the content of the user data area does not impair the ability to place barcodes in the same location once a location is found.

Figure 7:
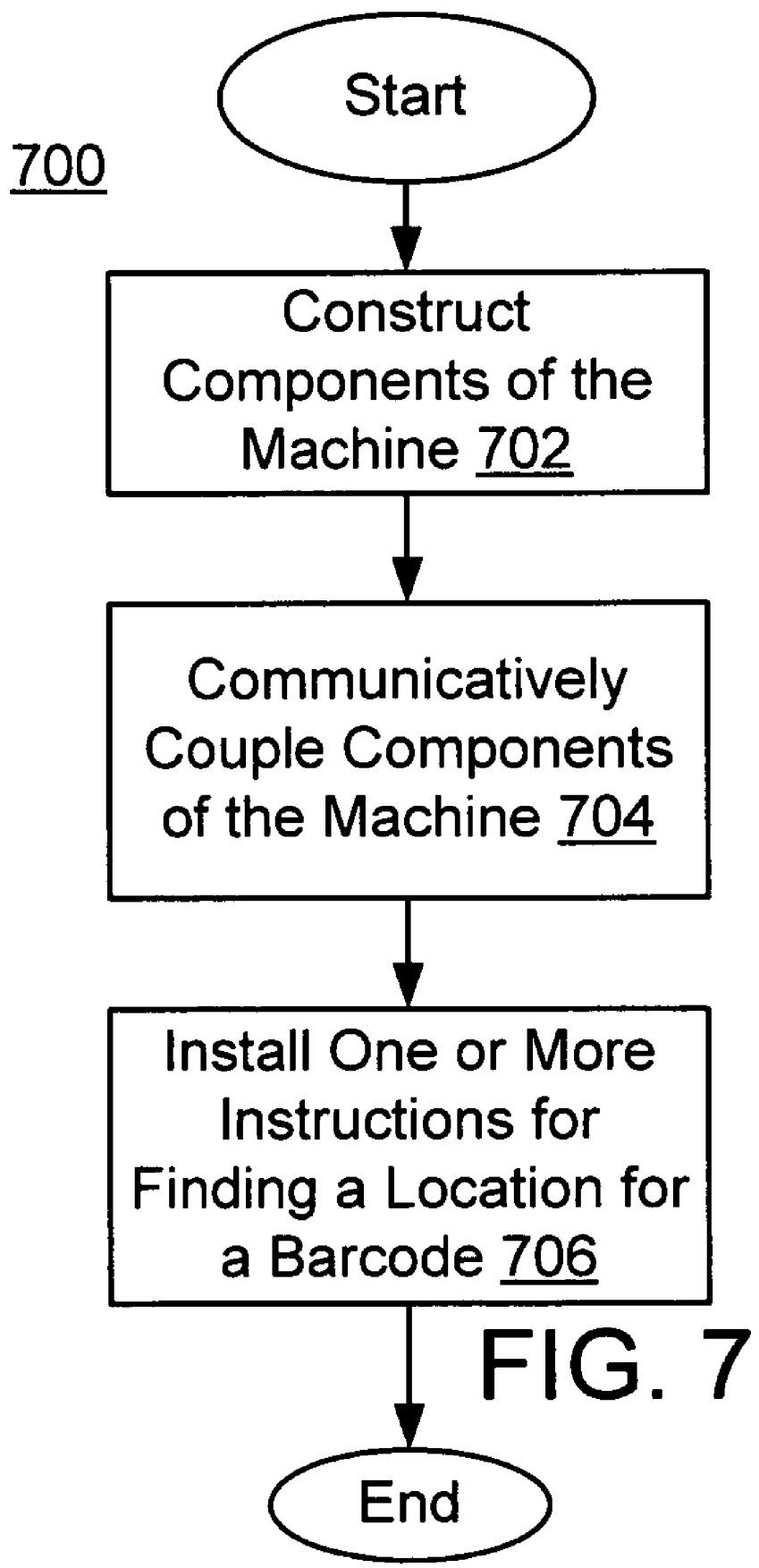
FIG. 7 shows a flowchart of an embodiment of a method of making a system for automatically locating a position for inserting a barcode into a document.

FIG. 7 shows a flowchart of an embodiment of a method 700 of making a system for automatically locating a position for inserting a barcode on a document. In step 702, the components of barcoding system 100 are constructed, which may include constructing output system 102, input system 104, memory system 106, processor system 110, communications system 112, and input/output system 114.

In step 704, the components of barcoding system 100 are communicatively coupled together, which may include communicatively coupling output system 102, input system 104, memory system 106, processor system 110, and input/output system 114 to communications systems 112.

In step 706, instructions 108 are installed in memory system 106, which may include loading one or more instructions into memory system 106 that carry out method 400 and/or may include loading placement analyzer 504, barcode generator 506, and barcode inserter 508 into memory system 106.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and the scope of the invention. In addition, modifications may be made without departing from the essential teachings of the invention.

The invention claimed is:

1. A machine-implemented method, the machine having a processor system including at least one processor and a memory system, the method comprising:
   the processor system automatically searching for a position associated with a document having document elements, the position being associated with a location for adding an additional document element, the position meeting one or more criteria that indicate that tile position is associated with an acceptable amount of interference of the document elements with the additional document element; and
   the processor system automatically placing the additional document element based on the automatically searching; the method being performed automatically without need for human intervention;
   the processor system creating a derivative document within the memory system from a document, the document including one or more document elements and creating the derivative document includes at least creating derivative document elements;
   the processor system creating a representation of an additional element within the memory system;
   the automatically searching including at least the processor system automatically searching for the position in the derivative document for the representation of the additional document element, the position meeting one or more criteria that indicate that the position has an acceptable amount of interference with the derivative document elements; and
   the processor system the placing of the additional document element including at least placing the representation of the additional element on the derivative document within the memory system based on the automatically searching.

2. The method of claim 1, wherein
   the additional document element includes at least a barcode, and
   the acceptable amount of interference is an amount of interference that is no more than an amount of interference that is expected to allow recovery of a barcode value using barcode reading equipment.

3. A system comprising one or more computer-readable media storing one or more instructions for carrying out the method of claim 2.

4. A machine-implemented method of making a system having at least one or more computer-readable media, comprising a computer writing one or more instructions for carrying out the method of claim 2 on the one or more computer-readable media.

5. The method of claim 1, further comprising the processor system creating an image of the document within the memory system prior to the automatically searching.

6. A system comprising one or more computer-readable media storing one or more instructions for carrying out the method of claim 5.

7. A machine-implemented method of making a system of one or more computer-readable media, comprising
a computer writing one or more instructions for carrying out the method of claim 5 on the one or more computer-readable media.

8. The method of claim 1, wherein the acceptable amount of interference preserves a minimum clearance between foreground derivative document elements and the additional document element, the document having a purpose, the foreground derivative document elements being a derivative document element that contains information that relates to the purpose of the document.

9. A system comprising one or more computer-readable media storing one or more instructions for carrying out the method of claim 8.

10. A machine-implemented method of making a system of one or more computer-readable media, comprising a computer writing one or more instructions for carrying out the method of claim 8 on the one or more computer-readable media.

11. The method of claim 1, wherein
the additional element includes at least a barcode;
the acceptable amount of interference is an amount of interference that is no more than an amount of interference that is expected to allow recovery of a barcode value using barcode reading equipment; and
the creating of the derivative document within the memory system by the processor system includes at least the processor system deriving a derivative document from the document in association with scanning the document, via a scanning apparatus of an input system.

12. A system comprising one or more computer-readable media storing one or more instructions for carrying out the method of claim 11.

13. A machine-implemented method of making a system having at least one or more computer-readable media, comprising a computer writing one or more instructions for carrying out the method of claim 11 on the one or more computer-readable media.

14. The method of claim 1, wherein
the additional element includes at least a barcode;
the acceptable amount of interference is an amount of interference that is no more than an amount of interference that is expected to allow recovery of a barcode value using barcode reading equipment; and
the creating of the derivative document within the memory system by the processor system includes at least the processor system a deriving a derivative document from the document in association with printing the document, via a printing apparatus of an output system.

15. A system comprising one or more computer-readable media storing one or more instructions for carrying out the method of claim 14.

16. A machine-implemented method of making a system of one or more computer-readable media, comprising a computer writing one or more instructions for carrying out the method of claim 14 on the one or more computer-readable media.

17. The method of claim 1, the one or more criteria including a specification as to one or more areas where the additional document element is not located.

18. A system comprising one or more computer-readable media storing one or more instructions for carrying out the method of claim 17.

19. A machine-implemented method of making a system having at least one or more computer-readable media, comprising a computer writing one or more instructions for carrying out the method of claim 17 on the one or more computer-readable media.

20. The method of claim 1, further comprising the processor system creating a representation of the additional document element, the representation being based at least in part of characteristics of the location.

21. A system comprising one or more computer-readable media storing one or more instructions for carrying out the method of claim 20.

22. A machine-implemented method of making a system having at least one or more computer-readable media, comprising a computer writing one or more instructions for carrying out the method of claim 20 on the one or more computer-readable media.

23. The method of claim 1, the one or more criteria being associated with one or more representations of the additional document element.

24. A system comprising one or more computer-readable media storing one or more instructions for carrying out the method of claim 23.

25. A machine-implemented method of making a system having at least one or more computer-readable media, comprising a computer writing one or more instructions for carrying out the method of claim 23 on the one or more computer-readable media.

26. The method of claim 1, the one or more criteria including a clearance that is larger than a predetermined amount.

27. A system comprising one or more computer-readable media storing one or more instructions for carrying out the method of claim 26.

28. A machine-implemented method of making a system of one or more computer-readable media, comprising
writing one or more instructions for carrying out the method of claim 26 on the one or more computer-readable media.

29. The method of claim 1, the location being a rectangular region having a height that is larger than a predetermined height and a width that is larger than a predetermined width.

30. A system comprising one or more computer-readable media storing one or more instructions for carrying out the method of claim 29.

31. A machine-implemented method of making a system having at least one or more computer-readable media, comprising a computer writing one or more instructions for carrying out the method of claim 29 on the one or more computer-readable media.

32. The method of claim 1, further comprising:
after performing the placing on a first document, performing the placing on a second document based on the automatically searching performed on the first document without repeating the automatically searching on the second document.

33. A system comprising one or more computer-readable media storing one or more instructions for carrying out the method of claim 32.

34. A machine-implemented method of making a system having at least one or more computer-readable media, comprising a computer writing one or more instructions for carrying out the method of claim 32 on the one or more computer-readable media.

35. The method of claim 1, the additional document element being a first additional document element and the placing being a placing of the first additional document element in a first location, the method further comprising:

the processor system placing a second additional document element in a second location, the second location is the first location, but is on a second document, the first document and second document having different contents; based on the automatically searching, the automatically searching being performed by the processor system only once for the first document and the second document, the automatically searching being a search for a position common to the first document and the second document.

36. A system comprising one or more computer-readable media storing one or more instructions for carrying out the method of claim 35.

37. A machine-implemented method of making a system of one or more computer-readable media, comprising writing one or more instructions for carrying out the method of claim 35 on the one or more computer-readable media.

38. A system comprising one or more computer-readable media storing one or more instructions for carrying out the method of claim 1.

39. A system comprising:

the memory system having at least one or more computer-readable media storing one or more instructions for carrying out the method of claim 1;

the processor system, which carries out the one or more instructions;

an input system for receiving the document; and an output system for producing the document with the additional document element.

40. A machine-implemented method of making a system having at least one or more computer-readable media, comprising a computer writing one or more instructions for carrying out the method of claim 1 on the one or more computer-readable media.

41. A machine-implemented method, the machine having a processor system including at least one processor and a memory system, the method comprising:

the processor system automatically searching for a position associated with a document having document elements, the position being associated with a location for adding an additional document element, the position meeting one or more criteria that indicate that the position is associated with an acceptable amount of interference of the document elements with the additional document element; and the processor system placing the additional document element based on the automatically searching;

the additional document element has a set of characteristics of a first representation during the automatically searching, and the method further comprising:

if a position that meets the one or more criteria is not found, the processor system searching for a set of characteristics of a second representation of the additional document element for which a position that meets the one or more criteria exists;

the processor creating a derivative document within the memory system from a document, the document including one or more document elements and creating the derivative document includes at least creating derivative document elements;

the processor system creating a representation of an additional element;

the automatically searching including at least the processor system automatically searching for the position in the derivative document for the representation of the additional document element, the position meeting one or more criteria that indicate that the position has an acceptable amount of interference with the derivative document elements; and the placing of the additional document element including at least the processor system placing the representation of the additional element on the derivative document within the memory system based on the automatically searching.

42. A system comprising one or more computer-readable media storing one or more instructions for carrying out the method of claim 41.

43. A machine method of making a system having at least one or more computer-readable media, comprising a computer writing one or more instructions for carrying out the method of claim 41 on the one or more computer-readable media.

44. A machine-implemented method, the machine having a processor system including at least one processor and a memory system, the method comprising:

the processor system automatically searching for a position associated with a document having document elements, the position being associated with a location for adding an additional document element, the position meeting one or more criteria that indicate that the position is associated with an acceptable amount of interference of the document elements with the additional document element; and the processor system placing the additional document element based on the automatically searching;

the one or more criteria is a first set of criteria, which includes one or more criteria, and the automatically searching further comprises:

if a position that meets the one or more criteria is not found, choosing a second set of criteria, the second set of criteria being different from the first set of criteria and the second set of criteria including one or more criteria, and the processor system searching for a position associated with the document that meets the second set of criteria;

the processor system creating a derivative document within the memory system from a document, the document including one or more document elements and creating the derivative document includes at least creating derivative document elements;

the processor system creating a representation of an additional element;

the automatically searching including at least the processor system automatically searching for the position in the derivative document for the representation of the additional document element, the position meeting one or more criteria that indicate that the position has an acceptable amount of interference with the derivative document elements; and the placing of the additional document element including at least the processor system placing the representation of the additional element, within the memory system on the derivative document based on the automatically searching.

45. A system comprising one or more computer-readable media storing one or more instructions for carrying out the method of claim 44.

46. A machine-implemented method of making a system having at least one or more computer-readable media, comprising a computer writing one or more instructions for carrying out the method of claim 44 on the one or more computer-readable media.

47. A machine-implemented method, the machine having a processor system including at least one processor and a memory system, the method comprising:
   the processor system automatically searching for a position associated with a document having document elements, the position being associated with a location for adding an additional document element, the position meeting one or more criteria that indicate that the position is associated with an acceptable amount of interference of the document elements with the additional document element;
   the processor system placing the additional document element based on the automatically searching;
   the processor system creating a derivative document within the memory system from a document, the document including one or more document elements and creating the derivative document includes at least creating derivative document elements;
   the processor system creating a representation of an additional element;
   the automatically searching including at least the processor system automatically searching for the position in the derivative document for the representation of the additional document element, the position meeting one or more criteria that indicate that the position has an acceptable amount of interference with the derivative document elements; and
   the placing of the additional document element including at least the processor system placing the representation of the additional element on the derivative document based on the automatically searching;
   wherein the derivative document is a result of initiating printing operations.

48. A system comprising one or more computer-readable media storing one or more instructions for carrying out the method of claim 47.

49. A machine-implemented method of making a system having at least one or more computer-readable media, comprising a computer writing one or more instructions for carrying out the method of claim 47 on the one or more computer-readable media.

50. A system comprising one or more computer-readable media storing one or more instructions for carrying out the method of claim 47, the computer-readable medium storing a printer driver, the printer driver including the one or more instructions for carrying out the method and one or more instructions for driving a printer.

51. A machine-implemented method, the machine having a processor system including at least one processor and a memory system, the method comprising:
   the processor system automatically searching for a position associated with a document having document elements, the position being associated with a location for adding an additional document element, the position meeting one or more criteria that indicate that the position is associated with an acceptable amount of interference of the document elements with the additional document element;
   the processor system placing the additional document element based on the automatically searching;
   the processor system creating a derivative document within the memory system from a document, the document including one or more document elements and creating the derivative document includes at least creating derivative document elements;
   the processor system creating a representation of an additional element;
   the automatically searching including at least the processor system automatically searching for the position in the derivative document for the representation of the additional document element, the position meeting one or more criteria that indicate that the position has an acceptable amount of interference with the derivative document elements; and
   the placing of the additional document element including at least placing the representation of the additional element on the derivative document based on the automatically searching;
   wherein the derivative document is a representation of the document that results from acquiring an image of the document, via the input system.

52. A system comprising one or more computer-readable media storing one or more instructions for carrying out the method of claim 51.

53. A machine-implemented method of making a system having at least one or more computer-readable media, comprising a computer writing one or more instructions for carrying out the method of claim 51 on the one or more computer-readable media.

54. A system comprising one or more computer-readable media storing one or more instructions for carrying out the method of claim 51, the computer-readable medium storing a scanner driver, the scanner driver including the one or more instructions for carrying out the method and one or more instructions for driving a scanner.

55. A machine-implemented method, the machine having a processor system including at least one processor and a memory system, the method comprising:
   the processor system automatically searching for a position associated with a document having document elements, the position being associated with a location for adding an additional document element, the position meeting one or more criteria that indicate that the position is associated with an acceptable amount of interference of the document elements with the additional document element; and
   the processor system placing the additional document element based on the automatically searching;
   the processor system creating a derivative document in the memory system from a document, the document including one or more document elements and creating the derivative document includes at least creating derivative document elements;
   the processor system creating a representation of an additional element;
   the automatically searching including at least automatically the processor system searching for the position in the derivative document for the representation of the additional document element, the position meeting one or more criteria that indicate that the position has an acceptable amount of interference with the derivative document elements; and the placing of the additional document element including at least the processor system placing the representation of the additional element on the derivative document based on the automatically searching;

the location of the position being an area where the additional element may be placed without interfering with foreground derivative elements, the document having a purpose, foreground derivative document elements being derivative document elements that contain information that relates to the purpose of the document, the method further comprising:

if the automatically searching did not find the location, prior to creating the representation of the additional element, the processor system searching for one or more areas in the derivative document having a smaller amount or the same amount of foreground elements than other areas of the derivative document;

if the one or more areas are found, the processor system deriving information about a geometry of the one or more areas, wherein the creating of the representation of said additional element is based on the information about the geometry.

56. A system comprising one or more computer-readable media storing one or more instructions for carrying out the method of claim 55.

57. A machine-implemented method of making a system having at least one or more computer-readable media, comprising a computer writing one or more instructions for carrying out the method of claim 55 on the one or more computer-readable media.

58. A machine-implemented method, the machine having a processor system including at least one processor and a memory system, the method comprising:

the processor system automatically searching for a position associated with a document having document elements, the position being associated with a location for adding an additional document element, the position meeting one or more criteria that indicate that the position is associated with an acceptable amount of interference of the document elements with the additional document element; and the processor system placing the additional document element based on the automatically searching;

wherein the one or more criteria specify a priority of where to place the additional document element, wherein the searching is performed first within one or more areas having a higher priority than other areas within the document;

if the position is found by the processor system in the higher priority area, a lower priority area is not searched;

the processor system creating a derivative document within the memory system from the document, the document including one or more document elements and creating the derivative document includes at least creating derivative document elements;

the processor system creating a representation of an additional element;

the automatically searching including at least the processor system automatically searching for the position in the derivative document for the representation of the additional document element, the position meeting one or more criteria that indicate that the position has an acceptable amount of interference with the derivative document elements; and the placing of the additional document element including at least the processor system placing the representation of the additional element on the derivative document based on the automatically searching.

59. A system comprising one or more computer-readable media storing one or more instructions for carrying out the method of claim 58.

60. A machine-implemented method of making a system having at least one or more computer-readable media, comprising a computer writing one or more instructions for carrying out the method of claim 58 on the one or more computer-readable media.

61. A machine-implemented method, the machine having a processor system including at least one processor, an input system, and a memory system, the method comprising:

the processor system automatically searching for a position associated with a document having document elements, the position being associated with a location for adding an additional document element, the position meeting one or more criteria that indicate that the position is associated with an acceptable amount of interference of the document elements with the additional document element; and the processor system placing the additional document element based on the automatically searching;

the method further comprising:

based on the automatically searching, the processor system returning a list of locations associated with an acceptable amount of interference; and the processor system waiting for a response, via the input system, to the returning of the list, in which the response specifies where to place the additional document element;

the processor system creating a derivative document within the memory system from a document, the document including one or more document elements and creating the derivative document includes at least creating derivative document elements;

the processor system creating a representation of an additional element;

the automatically searching including at least automatically the processor system searching for the position in the derivative document for the representation of the additional document element, the position meeting one or more criteria that indicate that the position has an acceptable amount of interference with the derivative document elements; and the placing of the additional document element including at least the processor system placing the representation of the additional element on the derivative document based on the automatically searching.

62. A system comprising one or more computer-readable media storing one or more instructions for carrying out the method of claim 61.

63. A machine-implemented method of making a system of one or more computer-readable media, comprising writing one or more instructions for carrying out the method of claim 61 on the one or more computer-readable media.

64. A machine-implemented method, the machine having a processor system including at least one processor and a memory system, the method comprising:

the processor system automatically searching for one or more areas in a derivative document stored within the memory system that meet one or more criteria, the derivative document being derived from a document, the document having one or more document elements, and the derivative document having one or more derivative document elements derived from the document elements; and if the one or more areas are found, the processor system deriving information about a geometry of the one or more areas, after the deriving of the information about the geometry, the processor system creating a representation of an additional document element, the creating of the representation of the additional document element being based on the information about the geometry, the additional document element being a document element that is added to the derivative document in addition to the derivative document elements that were derived from the document elements, and the processor system placing the additional derivative document element in the derivative document.

65. The method of claim 64, the creating of the representation finds a width that is larger than a predetermined width and a height that is larger than a predetermined height.

66. A system comprising one or more computer-readable media storing one or more instructions for carrying out the method of claim 65.

67. A machine-implemented method of making a system having at least one or more computer-readable media, comprising a computer writing one or more instructions for carrying out the method of claim 65 on the one or more computer-readable media.

68. The method of claim 64, the creating of the representation finds a geometry that has a larger clearance than a predetermined amount.

69. A system comprising one or more computer-readable media storing one or more instructions for carrying out the method of claim 68.

70. A machine-implemented method of making a system of one or more computer-readable media, comprising writing one or more instructions for carrying out the method of claim 68 on the one or more computer-readable media.

71. The method of claim 64, wherein the additional document element includes at least a barcode, and the one or more criteria including at least that the one or more areas have an acceptable amount of interference, the acceptable amount of interference is an amount of interference that is no more than an amount of interference that is expected to allow recovery of a barcode value using barcode reading equipment.

72. A system comprising one or more computer-readable media storing one or more instructions for carrying out the method of claim 71.

73. A machine-implemented method of making a system having at least one or more computer-readable media, comprising a computer writing one or more instructions for carrying out the method of claim 71 on the one or more computer-readable media.

74. The method of claim 64, further comprising the processor system creating an image of the document prior to the automatically searching.

75. A system comprising one or more computer-readable media storing one or more instructions for carrying out the method of claim 74.

76. A machine-implemented method of making a system having at least one or more computer-readable media, comprising a computer writing one or more instructions for carrying out the method of claim 74 on the one or more computer-readable media.

77. The method of claim 64, wherein the derivative document is a result of initiating printing operations, via a printing apparatus of an output system.

78. A system comprising one or more computer-readable media storing one or more instructions for carrying out the method of claim 77.

79. A machine-implemented method of making a system of one or more computer-readable media, comprising writing one or more instructions for carrying out the method of claim 77 on the one or more computer-readable media.

80. The method of claim 64, wherein the derivative document is a representation of the document that results from acquiring an image of the document, via an input system.

81. A system comprising one or more computer-readable media storing one or more instructions for carrying out the method of claim 80.

82. A machine-implemented method of making a system having at least one or more computer-readable media, comprising a computer writing one or more instructions for carrying out the method of claim 80 on the one or more computer-readable media.

83. The method of claim 64, wherein the additional element includes at least a barcode;

the one or more criteria including at least that the one or more areas have an acceptable amount of interference, the acceptable amount of interference is an amount of interference that is no more than an amount of interference that is expected to allow recovery of a barcode value using barcode reading equipment; and deriving a derivative document from the document in association with scanning the document, via a scanning apparatus of an input system.

84. A system comprising one or more computer-readable media storing one or more instructions for carrying out the method of claim 83.

85. A machine-implemented method of making a system having at least one or more computer-readable media, comprising a computer writing one or more instructions for carrying out the method of claim 83 on the one or more computer-readable media.

86. The method of claim 64, wherein the additional element includes at least a barcode;

the one or more criteria including at least that the one or more areas have an acceptable amount of interference, the acceptable amount of interference is an amount of interference that is no more than an amount of interference that is expected to allow recovery of a barcode value using barcode reading equipment; and the method further comprising:

the processor system deriving a derivative document from the document in association with printing the document.

87. A system comprising one or more computer-readable media storing one or more instructions for carrying out the method of claim 86.

88. A machine-implemented method of making a system of one or more computer-readable media, comprising writing one or more instructions for carrying out the method of claim 86 on the one or more computer-readable media.

89. The method of claim 64, wherein the one or more criteria specify a priority of where to place the additional document element, causing the searching to be performed the processor system first within one or more high priority areas having a higher priority than other areas within the document; and if the area is found in the one or more high priority area, a lower priority area is not searched.

90. A system comprising one or more computer-readable media storing one or more instructions for carrying out the method of claim 89.

91. A machine-implemented method of making a system having at least one or more computer-readable media, comprising a computer writing one or more instructions for carrying out the method of claim 89 on the one or more computer-readable media.

92. The method of claim 64, the method further comprising: if the one or more areas are found and if the one or more areas include at least two areas, the processor system selecting one of the one or more areas based on a priority of where to place the additional document element.

93. A system comprising one or more computer-readable media storing one or more instructions for carrying out the method of claim 92.

94. A machine-implemented method of making a system having at least one or more computer-readable media, comprising a computer writing one or more instructions for carrying out the method of claim 92 on the one or more computer-readable media.

95. The method of claim 64, further comprising:
   based on the automatically searching, the processor system returning a list of locations associated with an acceptable amount of interference; and
   the processor system waiting for a response to the returning of the list, in which the response specifies where to place the additional document element.

96. A system comprising one or more computer-readable media storing one or more instructions for carrying out the method of claim 95.

97. A machine-implemented method of making a system of one or more computer-readable media, comprising
   writing one or more instructions for carrying out the method of claim 95 on the one or more computer-readable media.

98. The method of claim 64, the one or more criteria being associated with one or more representations of the additional document element.

99. A system comprising one or more computer-readable media storing one or more instructions for carrying out the method of claim 98.

100. A machine-implemented method of making a system having at least one or more computer-readable media, comprising a computer writing one or more instructions for carrying out the method of claim 98 on the one or more computer-readable media.

101. The method of claim 64, further comprising:
   after performing the placing on a first document, the processor system performing the placing on a second document based on the automatically searching performed on the first document without repeating the automatically searching on the second document.

102. A system comprising one or more computer-readable media storing one or more instructions for carrying out the method of claim 101.

103. A machine-implemented method of making a system having at least one or more computer-readable media, comprising a computer writing one or more instructions for carrying out the method of claim 101 on the one or more computer-readable media.

104. The method of claim 64, the additional document element being a first additional document element and the placing being a placing of the first additional document element in a first location, the method further comprising:
   the processor system placing a second additional document element in a second location based on the automatically searching, the automatically searching being performed only once.

105. A system comprising one or more computer-readable media storing one or more instructions for carrying out the method of claim 104.

106. A machine-implemented method of making a system of one or more computer-readable media, comprising
   writing one or more instructions for carrying out the method of claim 104 on the one or more computer-readable media.

107. A system comprising one or more computer-readable media storing one or more instructions for carrying out the method of claim 64;
   the processor system, which carries out the one or more instructions;
   the input system for receiving the document; and
   an output system for producing the document with the additional document element.

108. A system comprising one or more computer-readable media storing one or more instructions for carrying out the method of claim 64.

109. A machine-implemented method of making a system having at least one or more computer-readable media, comprising a computer writing one or more instructions for carrying out the method of claim 64 on the one or more computer-readable media.

110. A machine-implemented method, the machine having a processor system including at least one processor and a memory system, the method comprising:
   the processor system automatically searching an entire page for a position associated with a document having document elements, the position being associated with a location for adding an additional document element, the position meeting one or more criteria that indicate that the position is associated with an acceptable amount of interference of the document elements with the additional document element; and
   the processor system placing the additional document element based on the automatically searching;
   the processor system creating a derivative document in the memory system from a document, the document including one or more document elements and creating the derivative document includes at least creating derivative document elements;
   the processor system creating a representation of an additional element;
   the automatically searching including at least the processor system automatically searching for the position in the derivative document for the representation of the additional document element, the position meeting one or more criteria that indicate that the position has an acceptable amount of interference with the derivative document elements; and
   the placing of the additional document element including at least the processor system placing the representation of the additional element on the derivative document based on the automatically searching.

111. A machine-implemented method, the machine having a processor system including at least one processor and a memory system, the method comprising:
   the processor system automatically searching for at least one position associated with a document having document elements, by at least automatically choosing at least one candidate position and automatically determining whether the at least one candidate position is a suitable location for adding an additional document element, the automatically determining including at least determining whether the at least one candidate position meets one or more criteria that indicate whether the position is associated with an acceptable amount of interference of the document elements with the additional document element, the at least one candidate position, that resulted from the automatically choosing, including at least a first candidate position for which the automatically determining was considered; and the processor system placing the additional document element based on the automatically searching;

the processor system creating a derivative document in the memory system from a document, the document including one or more document elements and creating the derivative document includes at least creating derivative document elements;

the processor system creating a representation of an additional element;

the automatically searching including at least the processor system automatically searching for the position in the derivative document for the representation of the additional document element, the position meeting one or more criteria that indicate that the position has an acceptable amount of interference with the derivative document elements; and the placing of the additional document element including at least the processor system placing the representation of the additional element on the derivative document based on the automatically searching.

* * * * *